(12) United States Patent
Germata et al.

(10) Patent No.: US 7,886,761 B2
(45) Date of Patent: Feb. 15, 2011

(54) NON-INTERRUPTIBLE METER CHANGE OUT APPARATUS

(75) Inventors: Daniel T. Germata, Waukegan, IL (US); Jack Harbaugh, Geneva, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 907 days.

(21) Appl. No.: 11/635,735

(22) Filed: Dec. 7, 2006

(65) Prior Publication Data

US 2008/0135106 A1    Jun. 12, 2008

(51) Int. Cl.
*F16K 51/00*    (2006.01)
(52) U.S. Cl. .................... 137/315.06; 251/328; 251/329
(58) Field of Classification Search ............ 137/315.01, 137/315.06, 315.07; 73/201; 251/326, 328, 251/329, 367
See application file for complete search history.

(56) References Cited

U.S. PATENT DOCUMENTS

| | | | | |
|---|---|---|---|---|
| 227,943 A | * | 5/1880 | Wood .......................... | 251/329 |
| 3,946,754 A | * | 3/1976 | Cook ..................... | 137/315.06 |
| 4,355,656 A | * | 10/1982 | Smith ......................... | 137/318 |
| 4,364,406 A | * | 12/1982 | Bohlin ..................... | 137/15.13 |
| 5,014,730 A | * | 5/1991 | Fye .......................... | 137/454.2 |
| 5,039,063 A | * | 8/1991 | Louch et al. ................ | 251/328 |
| 5,732,728 A | * | 3/1998 | Maichel .................... | 137/15.14 |
| 5,785,086 A | * | 7/1998 | Boyce et al. ........... | 137/625.38 |
| 7,347,219 B2 | * | 3/2008 | Gohde et al. ................ | 137/613 |
| 2006/0131534 A1 | * | 6/2006 | Leroux ....................... | 251/326 |

* cited by examiner

*Primary Examiner*—Kevin L Lee
(74) *Attorney, Agent, or Firm*—Mark E. Fejer

(57) ABSTRACT

A method and apparatus for non-interruptible change out of a gas meter utilizing the meter set assembly swivel connections to create a bypass of the meter. The apparatus is machined to conform to the swivel and the threads of the meter inlet and outlet. A clamping mechanism maintains the meter and the apparatus in place while internal mechanisms create a gap between the swivel and the inlet or outlet of the meter. A sliding mechanism disengages the swivel gasket normally disposed between the meter inlet or outlet and the swivel for replacement during the meter exchange. Once the gap is created, a second apparatus similar to the first apparatus is attached to the other of the meter inlet or outlet. A hose providing fluid communication between the two apparatuses acts as the bypass during change out of the meter.

16 Claims, 31 Drawing Sheets

NON-INTERRUPTIBLE METER CHANGE OUT APPARATUS

BACKGROUND OF THE INVENTION

1. Field of the Invention

This invention relates to an apparatus and method for change out, i.e. removal and reinstallation, of natural gas meters typically employed in residential and commercial settings without interrupting the gas service to the natural gas consumer.

2. Description of Related Art

State Public Service Commissions require natural gas utilities to exchange residential and commercial meter sets for various reasons every 7-10 years, typically based upon state mandated sampling programs. Some of the reasons for this requirement include leaks reported by the consumer, requirements of corporate policies, exchanges mandated by regulatory bodies, tampering, lot failure programs, and those reported to be reading incorrectly. The current method for exchanging these meters requires a service technician to shut off the flow of gas to the consumer, thereby interrupting the service to the consumer. As part of the exchange, the service technician must enter the premises of the consumer to ensure that all gas appliances are operating properly. At the same time, safety inspections are performed. The total time to complete the exchange at the consumer's premises is approximately 40 minutes, and there is the potential for appliance malfunction requiring the repair of the appliance at the utilities' expense. Not only is this an inconvenience to the consumer whose service is interrupted, but also the interaction with the consumer and the subsequent re-lighting of gas appliances significantly reduces the efficiency of the service technician. Thus, due to consumer inconvenience and the substantial costs to the utilities associated with exchanging meters, it is apparent that the ability to exchange a meter without interrupting the flow of gas is highly desirable.

The typical gas meter comprises upward extending, threaded inlet and outlet openings connected by means of inlet and outlet swivels to a meter bar having a gas inlet end and a gas outlet end. Disposed between the swivel ends connected with the meter inlet and outlet openings is a gasket. The meter inlet and outlet openings are secured to the swivels by means of threaded nuts.

SUMMARY OF THE INVENTION

It is one object of this invention to provide an apparatus and method for the exchange, or change out, of gas meters without interrupting the flow of gas to the consumer. This object is addressed by an apparatus, two of which are required, and method utilizing the meter set assembly swivel connections to create a bypass of the residential or commercial meter. The first apparatus, referred to herein as an inlet bypass assembly, which diverts the flow of gas from into the meter to the second apparatus, is machined to conform to the outside diameter of the swivel and the meter inlet threads. A clamping mechanism maintains the meter and the inlet bypass assembly in place while mechanisms internal to the inlet bypass assembly create a gap between the swivel and the inlet opening of the meter. A sliding mechanism disengages the swivel gasket normally disposed between the meter inlet opening and the swivel for replacement during the meter exchange. Once the gap is created, the second apparatus, referred to herein as the outlet bypass assembly, similar to the inlet bypass assembly, is attached to the meter outlet. A hose providing fluid communication between the two bypass assemblies acts as the bypass during change out of the meter.

During the change out procedure, a minimum pressure of 4.5" of water column must be maintained to the consumer to ensure sufficient gas supply to the gas consuming appliances. The apparatus is able to operate in all ambient temperatures ranging from about −20° F. to about 120° F. The use of the bypass assembly and method of this invention saves both money and time by eliminating time spent making appointments with the consumers (phone, mail, etc.), time spent interacting with the consumer and turning the gas on and off during the process, time spent ensuring consumer appliances are functioning properly, liability involved in entering the premises of the consumers, and costs incurred repairing broken appliances after gas shutoff.

The bypass assemblies of this invention form sealed bores around the inlet and outlet connection interfaces between the swivels and the meter. With the bores in place, the swivels are free to behave like pistons and travel up and down relative to the meter without leaking. To accomplish this task, each bypass assembly comprises two halves that are clamped together to create an airtight seal around both the meter threads and swivel without breaking the seal between the swivel and the meter.

The bypass assembly of this invention, two of which are required for performance of the meter change out procedure, comprises two half assemblies—a handle half assembly that creates or forms the front half of the bore and a slide half assembly that completes the opposite or back half of the bore, thereby forming a full bore. The handle half assembly comprises seven basic components—a slider, a threadclamp, a gasket separator, sides, a swivel seal, a threadclamp guide, and a swivelclamp—each of which is described in detail herein below. The slide half assembly comprises five basic components—a camlock, sides, a swivel seal, a meter seal, and a slider—each of which is also described in detail herein below. As previously indicated, because each meter set employs two swivels, one for connecting each of the meter inlet and the meter outlet, two bypass assemblies are required to carry out the non-interrupted meter change out. Although substantially identical, there are some minor differences between the two assemblies based upon whether the apparatus is used on the meter inlet side or the meter outlet side of the meter set. These differences are discussed in more detail herein below.

BRIEF DESCRIPTION OF THE DRAWINGS

This and other objects and features of this invention will be better understood from the following detailed description taken in conjunction with the drawings wherein.

DETAILED DESCRIPTION OF THE PRESENTLY PREFERRED EMBODIMENTS

Figure 18:
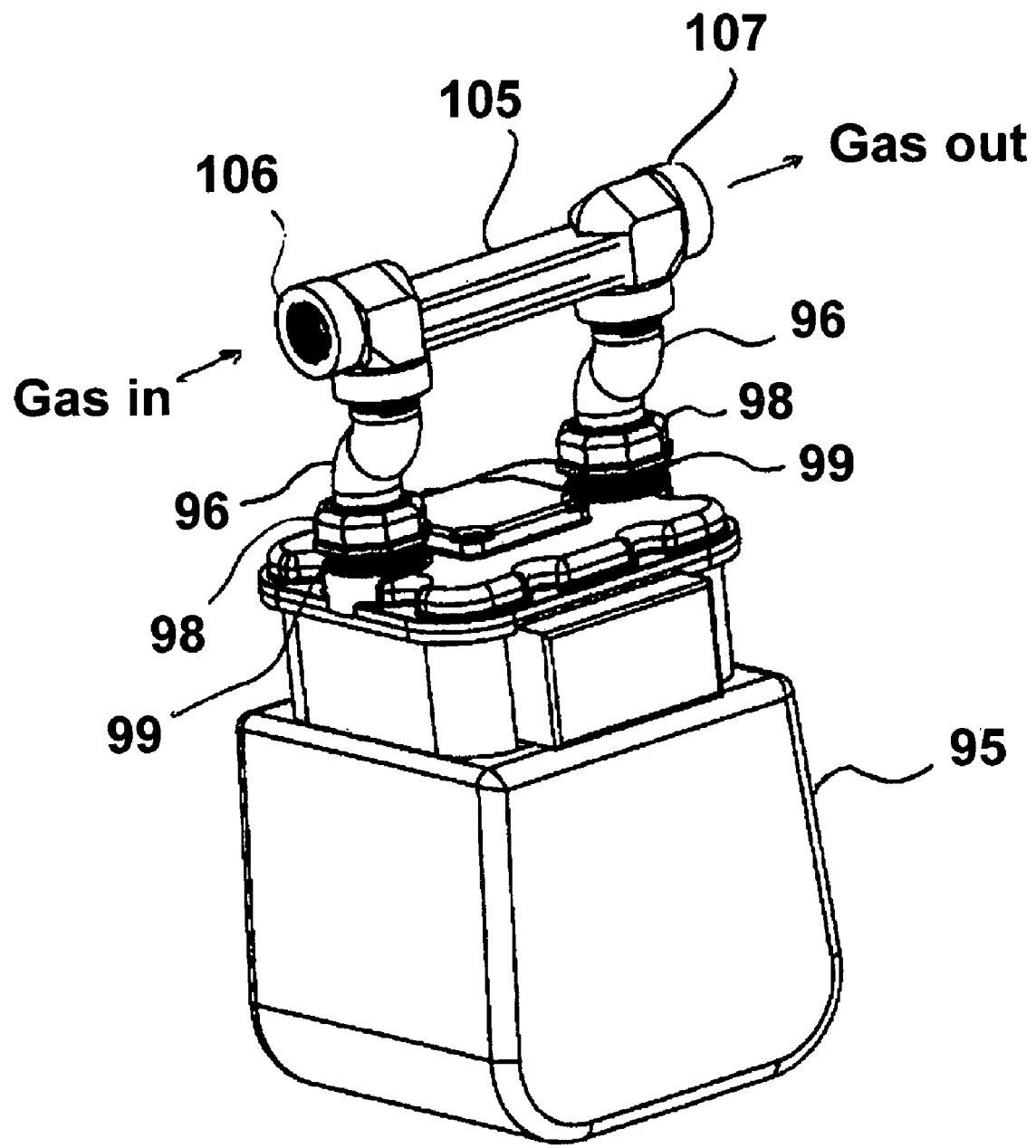
FIG. 18 is a perspective view of a fully assembled gas meter and meter set to which the apparatus of this invention may be applied.
Figure 19:
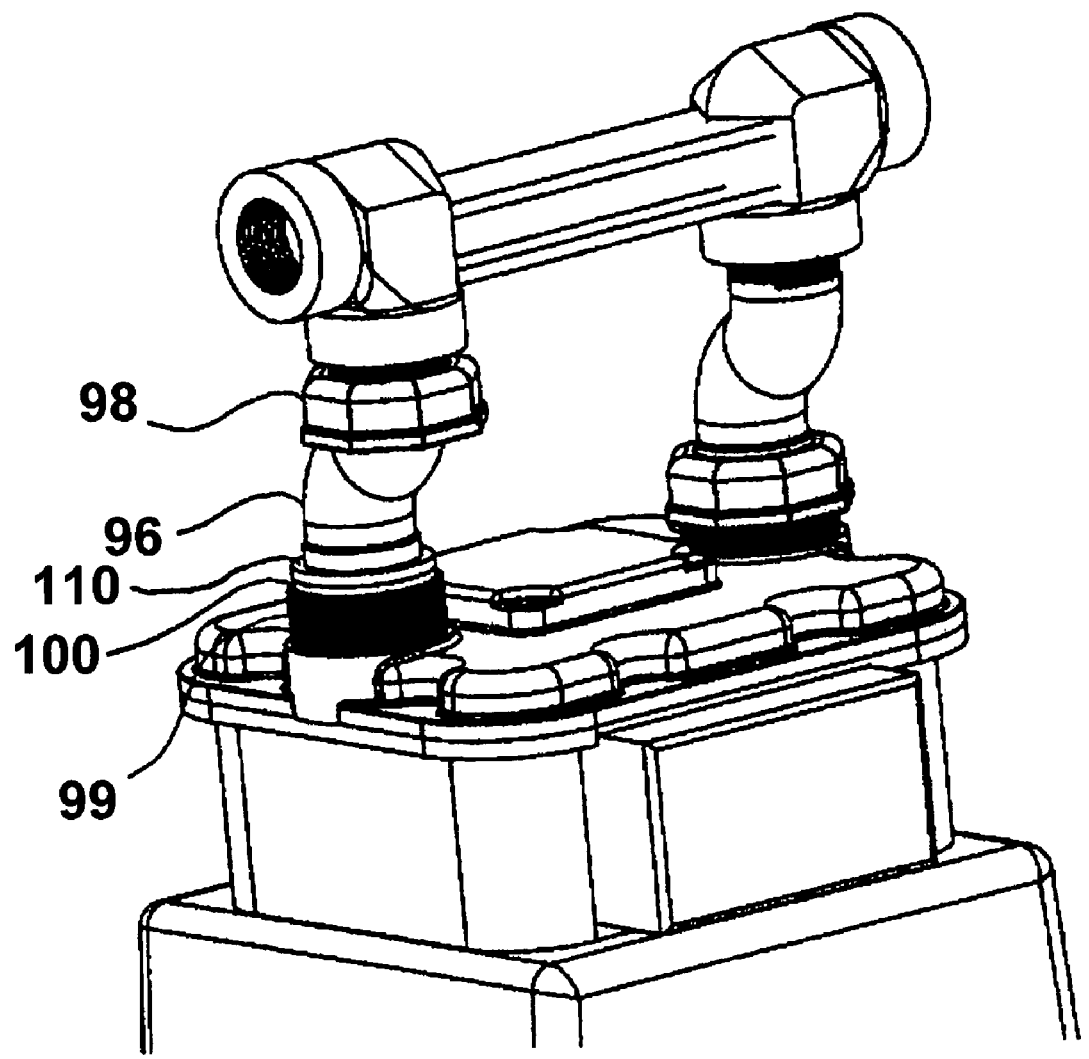
FIG. 19 is a close-up perspective view showing the connection between the gas meter and swivel.
Figure 20:
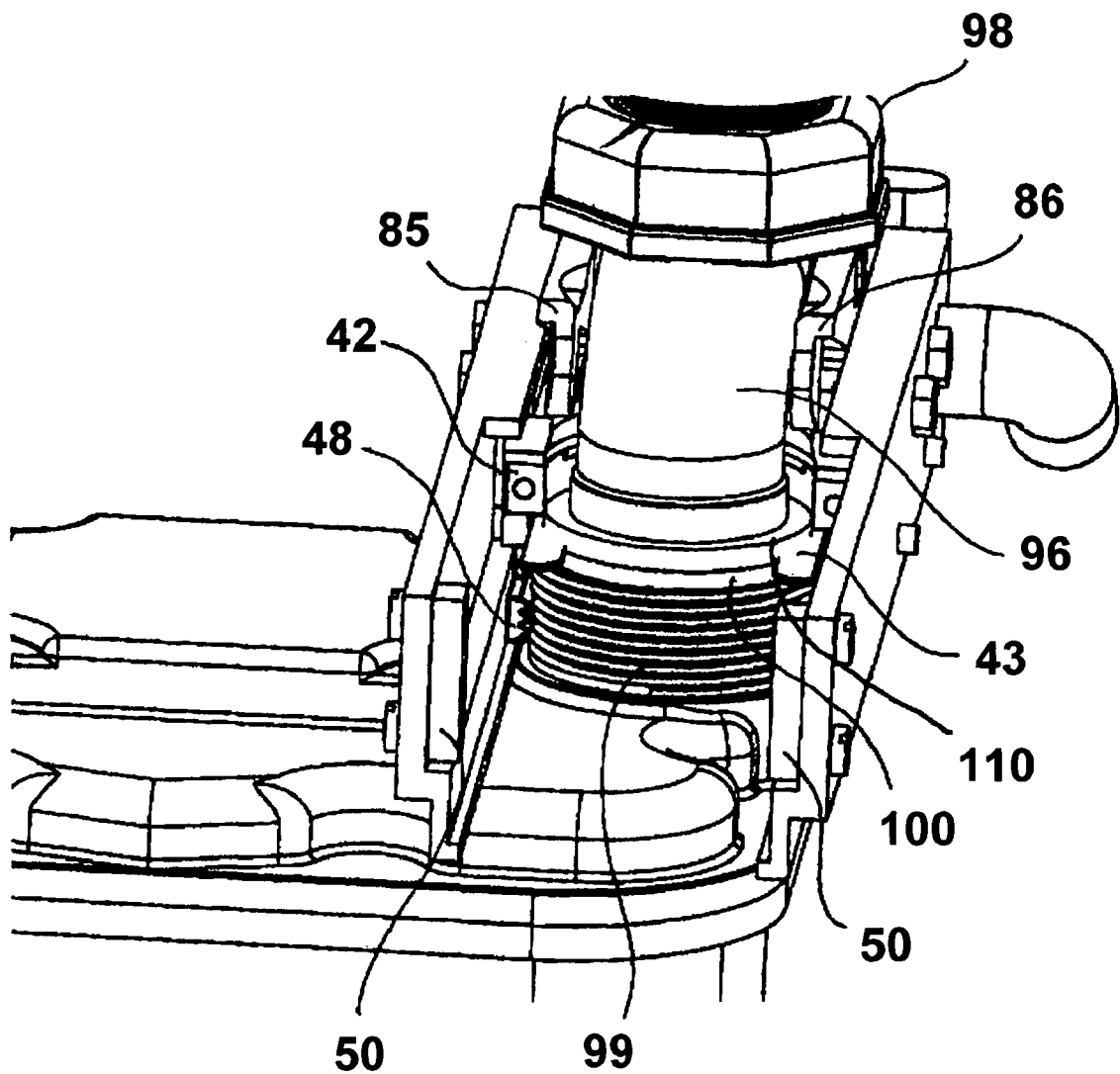
FIG. 20 is a diagram showing the handle half assembly in accordance with one embodiment of this invention disposed around a swivel and meter threads with the swivelclamp clamp raised.
Figure 21:
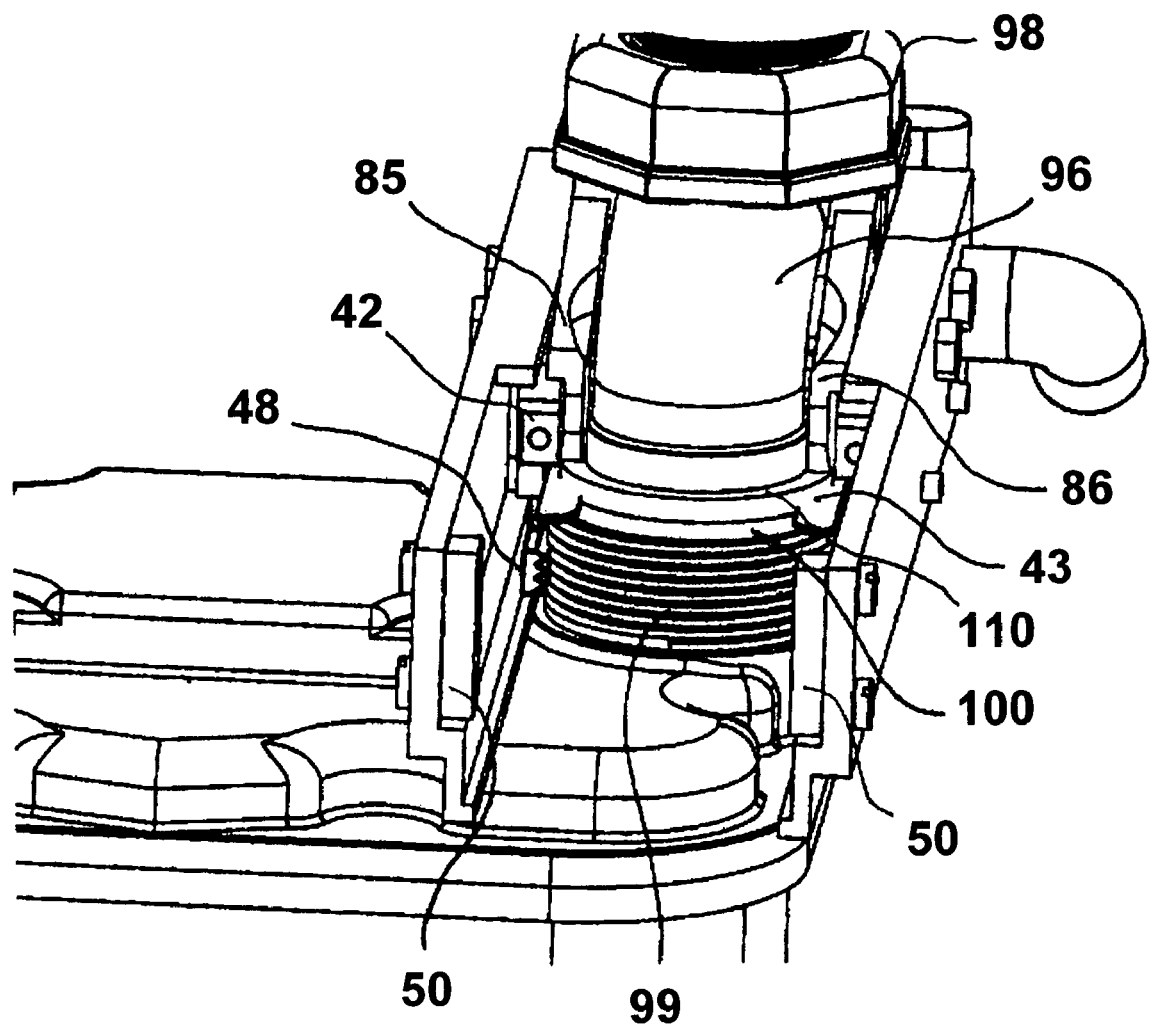
FIG. 21 is a diagram showing the handle half assembly in accordance with one embodiment of this invention disposed around a swivel and meter threads with the swivelclamp clamp lowered.

A typical meter set assembly with swivel connections connected to a gas meter is shown in FIG. 18. As shown therein, the meter set assembly includes two swivels 96, one through which gas flows into the meter 95 connected thereto and the other through which gas flows out of the meter to the gas consuming appliance. The swivels comprise a threaded end by which the swivels are connected with meter bar 105. The opposite end of the swivel comprises a laterally extending peripheral ledge 110, as shown in FIGS. 19, 20 and 21, which, together with the peripheral surface of the swivel, forms an el. The swivels are connected to the meter by threaded nuts 98 which are threaded onto the meter threads 99.

The bypass assemblies of this invention provide a sealed bore around the connection between the swivel and the meter threads. With the bore in place, the area surrounding the connection between the swivel and the meter threads is isolated from the surrounding environment, thereby enabling the swivel to travel up and down relative to the meter without leaking. Each bypass assembly of this invention comprises two half assemblies that are clamped together to create the full sealed bore around both the meter threads and the swivel, initially without breaking the seal between the swivel and the meter.

Figure 1:
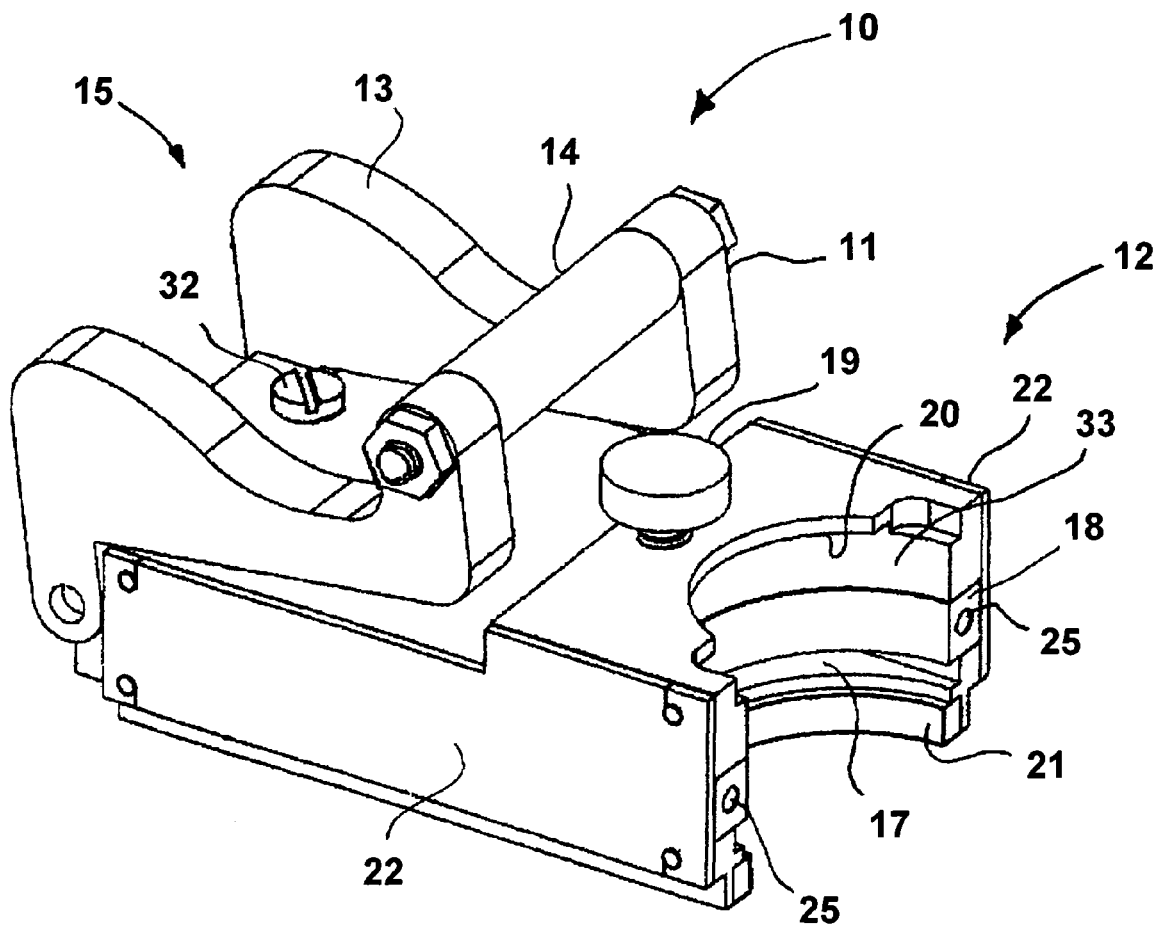
FIG. 1 is a perspective view of the slide half assembly of the bypass assembly in accordance with one embodiment of this invention.
Figure 2:
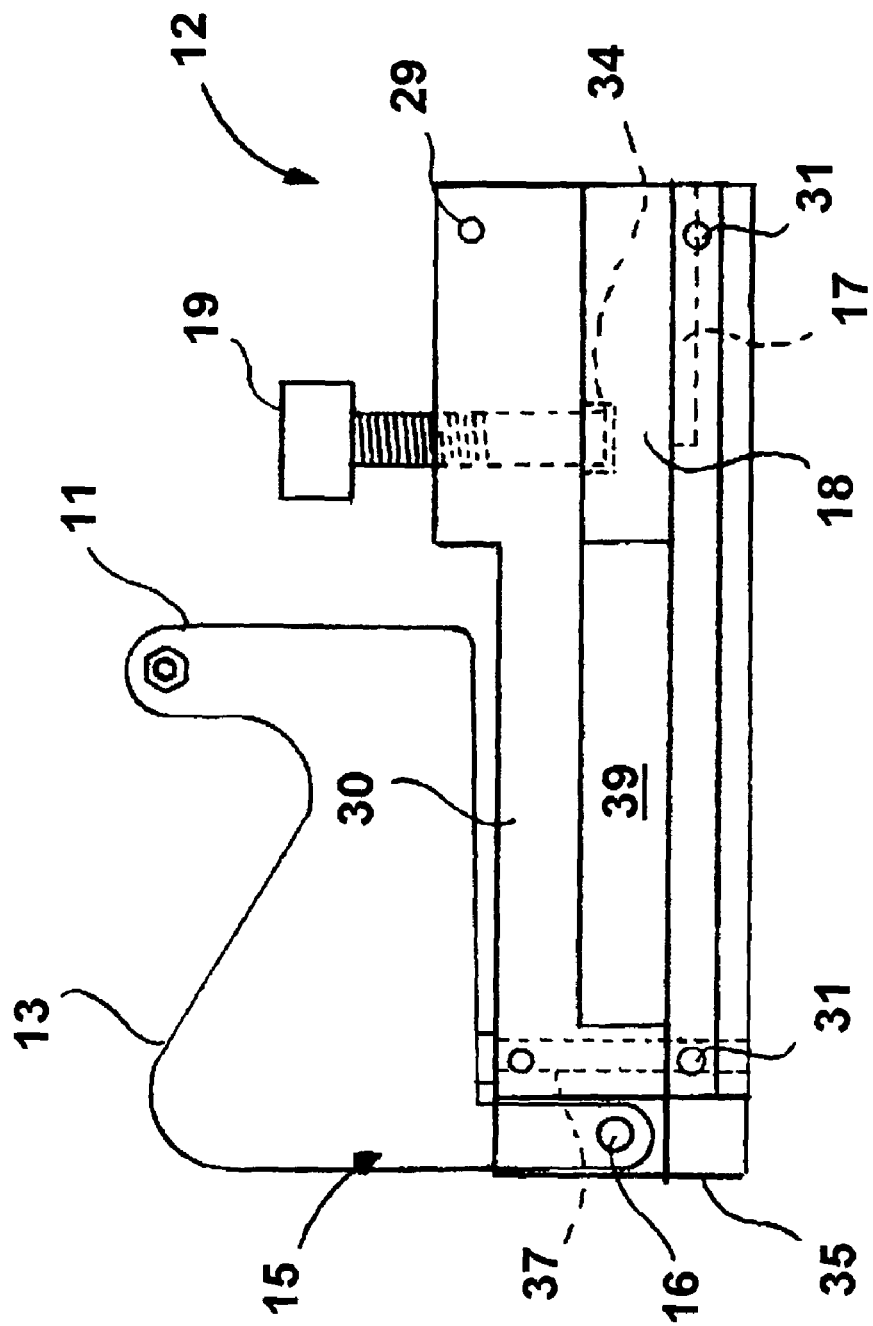
FIG. 2 is a lateral view of a slide half assembly in accordance with one embodiment of this invention.
Figure 29:
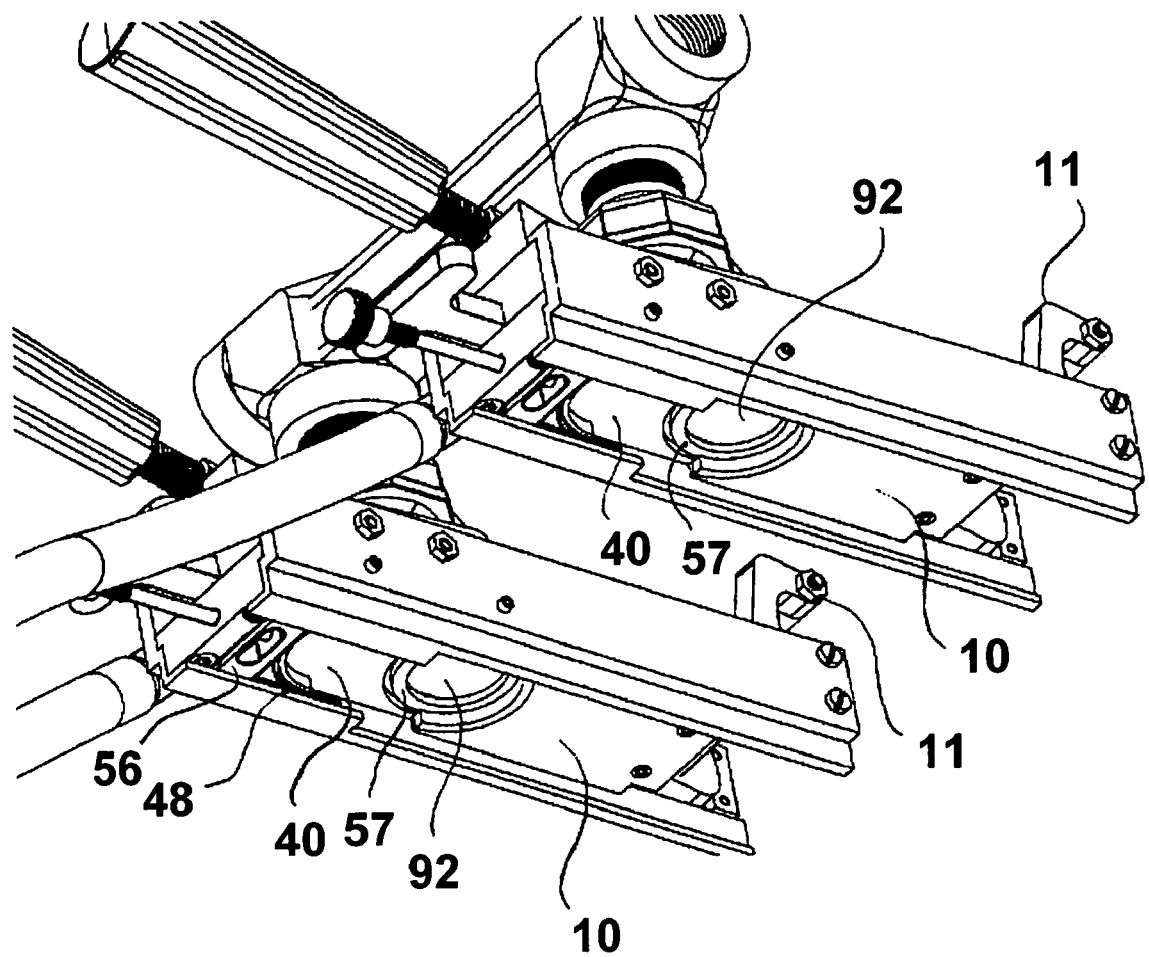
FIG. 29 is a perspective underside view of the bypass assemblies of this invention after removal of the meter from the swivels.

A first half assembly 10, also referred to herein as a slide half assembly, is shown in FIGS. 1 and 2. The slide half assembly comprises a front end 12 and a back end 15. The front end of the slide half assembly forms a half bore which, upon mating with the front end of a second half assembly 40, also referred to herein as a handle half assembly, shown in perspective view in FIG. 8, results in the formation of a full bore 92 as shown in FIG. 29. As shown in FIGS. 1 and 2, slide half assembly 10 comprises five main components, each of which is discussed in more detail herein below—camlock 11, slide half assembly sides 22, swivel seal 33, slider 18, and meter seal 21, which comprises a resilient gasket material.

Figure 4:
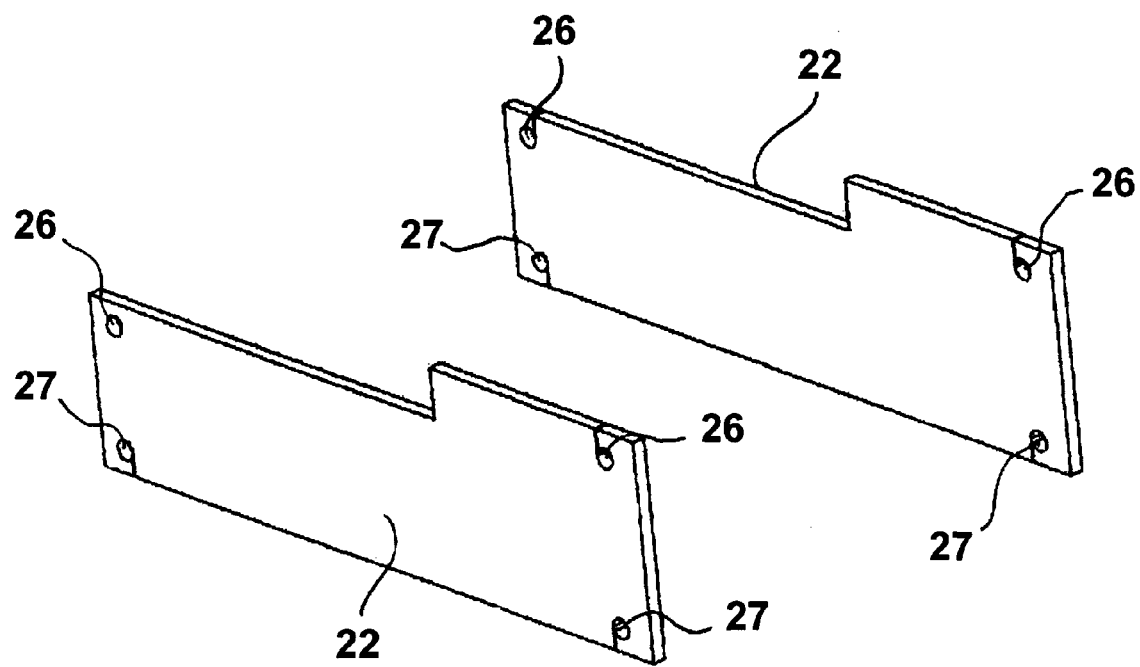
FIG. 4 is a perspective view showing the sides of the slide half assembly in accordance with one embodiment of this invention.
Figure 5:
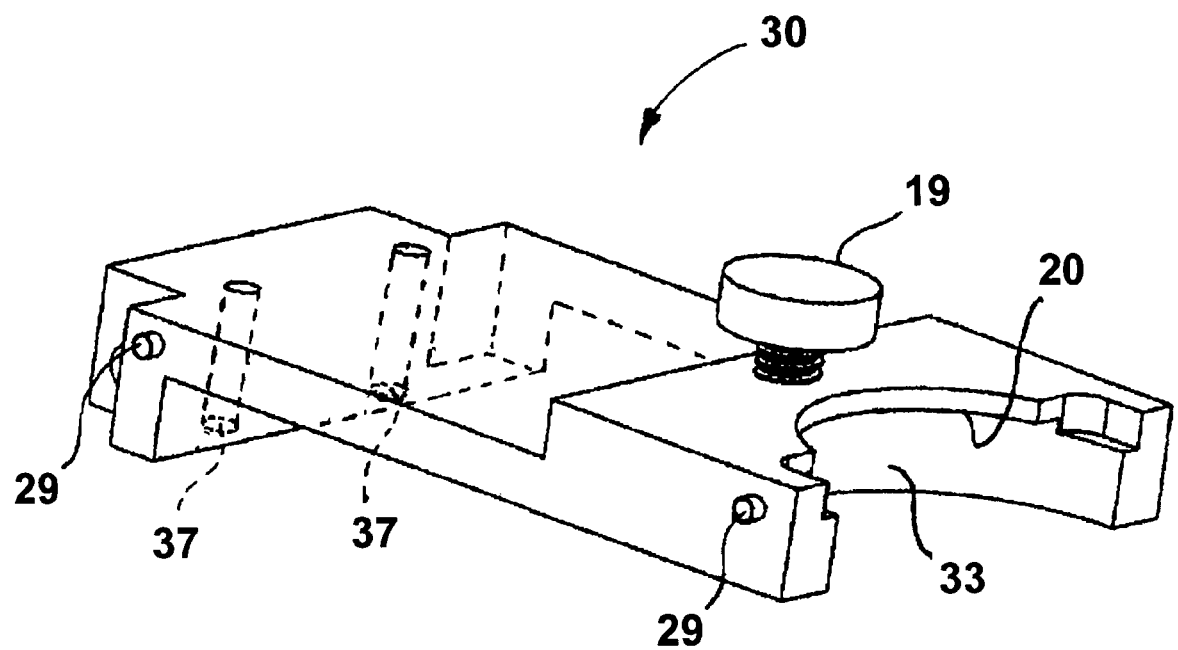
FIG. 5 is a perspective view of the upper section of the slide half assembly comprising a swivel seal including a bypass locking mechanism in accordance with one embodiment of this invention.
Figure 6:
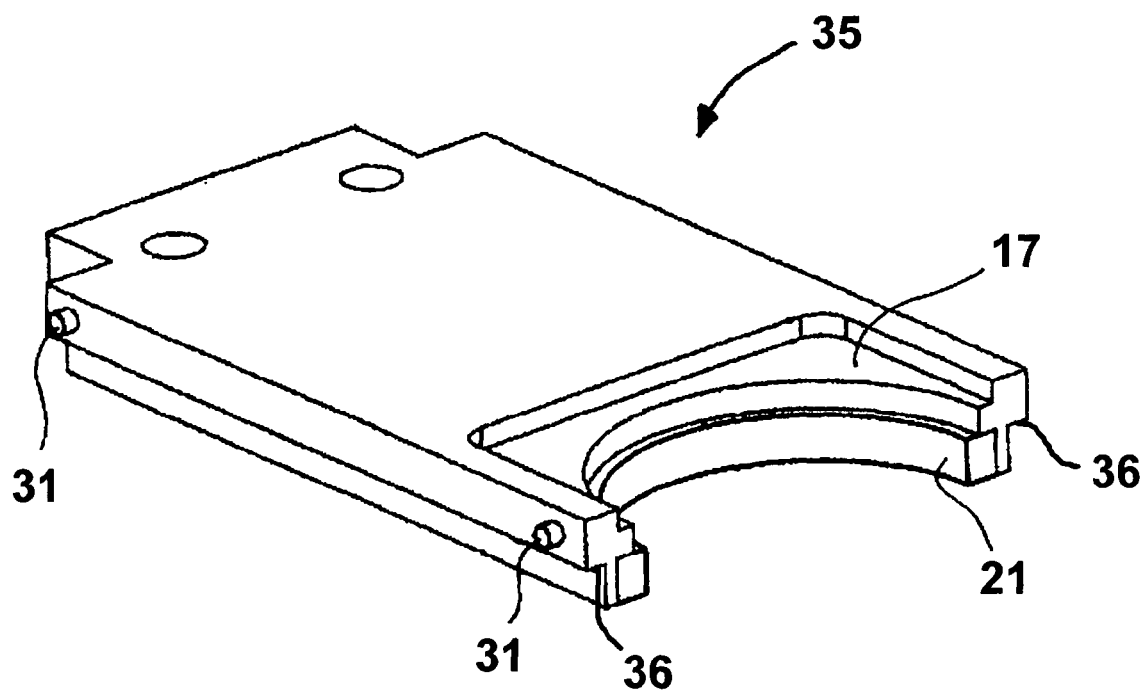
FIG. 6 is a perspective view of the lower section of the slide half assembly comprising a meter seal in accordance with one embodiment of this invention.

Slide half assembly 10 is comprised of a slide half upper section 30, shown in FIG. 5 and a slide half lower section 35, shown in FIG. 6. The top surface of slide half upper section 30 extends beyond the periphery of the slide half assembly half bore, forming a retaining ledge 20 which acts to retain the swivel from exiting the bore when the bypass assembly is engaged around the swivel. Slide half upper section 30 comprises alignment pins 31 along both sides and slide half bottom section 35 comprises alignment pins 29 on both sides. Alignment pins 29, 31 align with alignment openings 26, 27 of slide half assembly sides 22 shown in FIG. 4. In this manner, the slide half upper section 30 is joined with slide half lower section 35 to form a substantially planar cavity 39 therebetween extending, as shown in FIG. 2, from the front end 12 to proximate the back end 15 of slide half assembly 10.

Figure 7:
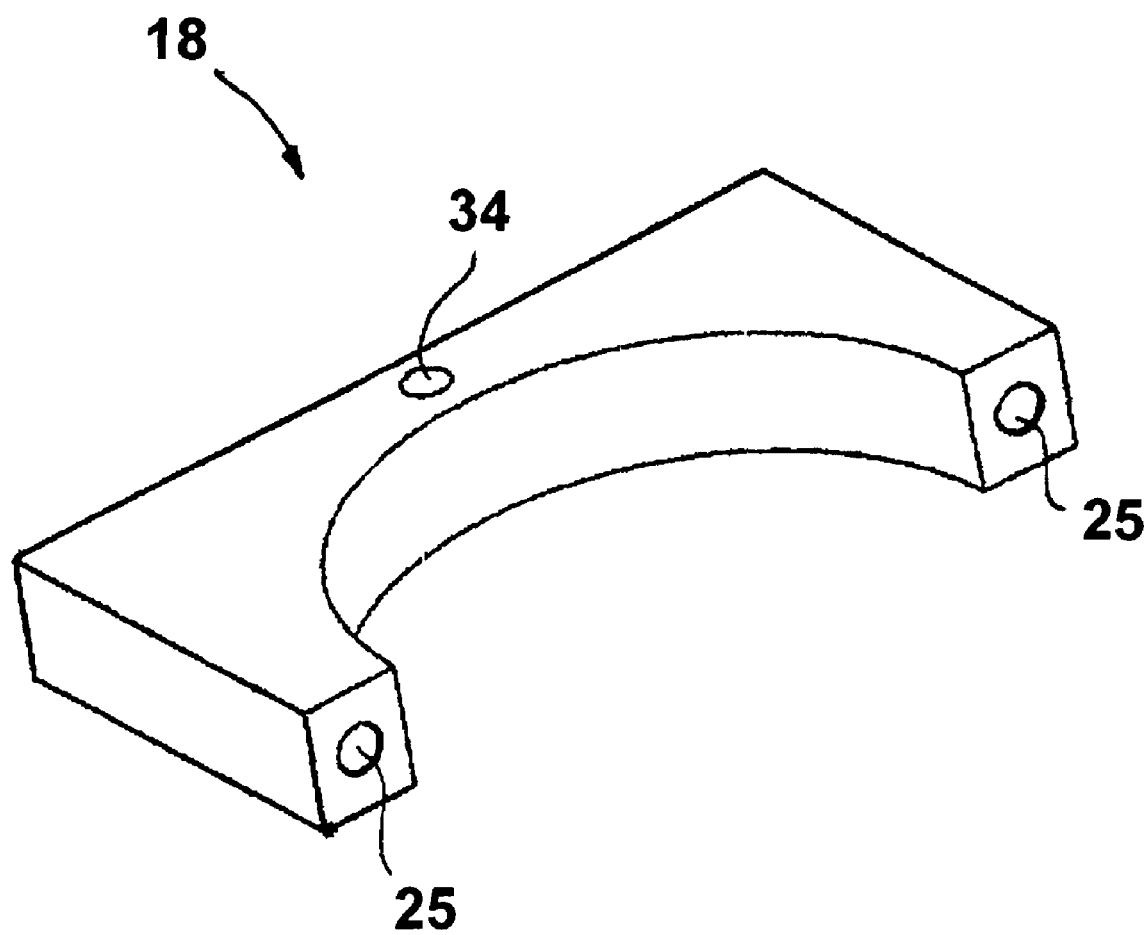
FIG. 7 is a perspective view of a slide half assembly slider in accordance with one embodiment of this invention.

Disposed within the substantially planar cavity is slide half slider 18, shown in perspective view in FIG. 7, having a half bore shaped front end and forming a vertical bore 34. Slider 18 is sized to fit snugly within the substantially planar cavity 39 and is slidable from proximate the back end 15 to the front end 12 of slide half assembly 10. When disposed at the front end 12 of slide half assembly 10, vertical bore 34 is aligned with bypass lock 19, shown in FIGS. 1, 2 and 5, in the form of a threaded knob which is insertable into vertical bore 34 to lock slider 18 at the front end of the slide half assembly. It will be apparent to those skilled in the art that other locking means, such as pins, dowels and the like may also be employed, and such other locking means are deemed to be within the scope of this invention.

Figure 3:
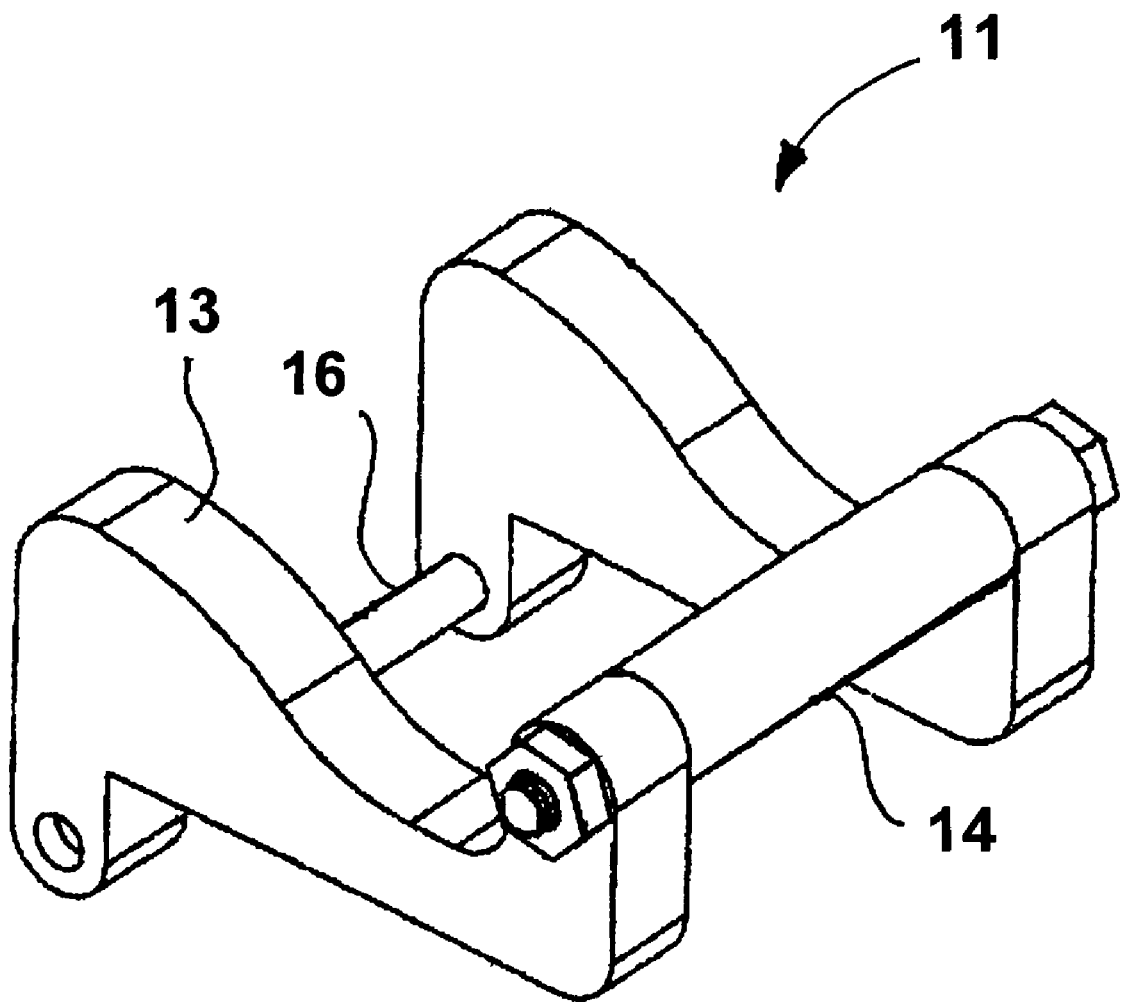
FIG. 3 is a perspective view of the camlock of the slide half assembly in accordance with one embodiment of this invention.

Camlock 11 enables the entire slide half assembly to be locked in place against the handle half assembly to form and maintain the full bore precisely located around the swivel 96 and meter threads 99. Camlock 11 comprises two parallel cams 13 connected by a handle 14 and pivotably connected by means of pivot shaft 16, as shown in FIGS. 2 and 3, with the back end 15 of slide half assembly 10. The camlock applies a horizontal clamping force along the centerline of the slide half assembly by a cam action. When handle 14 is pulled toward the back end of the slide half assembly, pivoting the camlock around the pivot shaft 16, the camlock cams against the camlock stops 50 on the bypass assembly sides 60 shown in FIG. 12 to apply the required pressure to lock the slide half assembly and the handle half assembly together. By virtue of this arrangement, the horizontal clamping force created by the camlock is always centered vertically along the slide half assembly to keep the slide half assembly from swinging up or down relative to the handle half assembly during the locking process. The sides 22 of slide half assembly 10, shown in FIG. 4, locate, strengthen and seal the slide half assembly as previously indicated by securing the slide half upper section 30, also referred to herein as the slide half swivel seal, and the slide half lower section 35, also referred to herein as the slide half meter seal, together. The slide half sides strengthen the slide half assembly by providing support at the ends of the slide half swivel seal and slide half meter seal. In addition, the slide half sides seal the substantially planar cavity 39 disposed between the slide half swivel seal and the slide half meter seal that houses the slide half slider 18. When the bypass assembly of this invention is in a bypass mode of operation, the cavity is pressurized and, thus, must not leak. To create the seal around the cavity, in accordance with one embodiment of this invention, the slide half sides are epoxied into place on the slide half swivel seal and slide half meter seal.

In addition to the slide half assembly sides, slide half assembly upper section 30 is connected with slide half assembly lower section 35 through the use of two countersunk blind threaded bores 37 on the bottom of the slide half assembly upper section as shown in FIG. 5. The countersink allows the slide half assembly top section to be located onto the slide half assembly lower section through the use of hollow dowel pins. The thread allows the slide half assembly lower section to be affixed to the slide half assembly upper section through the use of socket cap screws 32.

The primary functions of the slide half assembly lower section, i.e. slide half meter seal, are to provide structurally the lower half of the slide half assembly, to align and create a seal around the threads of the meter, and to provide a face for the swivel to seal against during the bypass operation. The bottom lateral edges 36 of the slide half assembly lower section as shown in FIG. 6 are machined to allow it to be supported on the inward extending support ledges 63 of sides 60 of the bypass assembly, as shown in FIG. 12. The top surface of the slide half assembly lower section forms a recess 17 at the front end, forming a gasket separator receiving slot to allow the slide half assembly to slide all the way forward into the handle half assembly during the locking operation without any interference from the gasket separator 43 shown in FIG. 11. The countersunk holes proximate the back end of the slide half assembly lower section are sized and aligned to receive the hollow dowel pins pressed into the slide half assembly upper section, thereby enabling the clamping of the slide half assembly upper and lower sections together through the use of socket cap screws.

The bottom half bore of the slide half assembly lower section is lined with a gasket forming the meter seal 21 as shown in FIG. 6. In accordance with one preferred embodiment of this invention, the gasket is comprised of a low durometer polyurethane rubber. When the slide half assembly is locked by the camlock against the handle half assembly, the gasket is pressed into the meter threads, forming a meter thread seal. The top surface of the slide half assembly lower section is finished very smooth and acts as a sealing mechanism to keep gas from escaping into the atmosphere when the bypass is engaged and the meter is removed.

Slide half slider 18, shown in FIG. 7, completes the half bore of the slide half assembly and completes the full bore around the swivel during the transition from gas going through the meter to gas going solely through the bypass. In this way, the operator is able to separate the meter from the swivel without any gas leaking. When the bypass assembly is in bypass mode, slide half slider 18 is pushed by handle half slider 42 of the handle half assembly shown in FIGS. 8, 9 and 17 toward the back end 15 of the slide half assembly. To retrieve slider 18 from the back end of the slide half assembly, the slider contact or mating surfaces of slider 18 and slider 42 are provided with retrieval magnets 25 and 47, respectively, thereby enabling engagement and disengagement of the bypass simply by moving the slider 42. Without the magnets, slide half assembly slider 18 would be unable to return to its original position when the apparatus returns to a non-bypass mode of operation.

Figure 8:
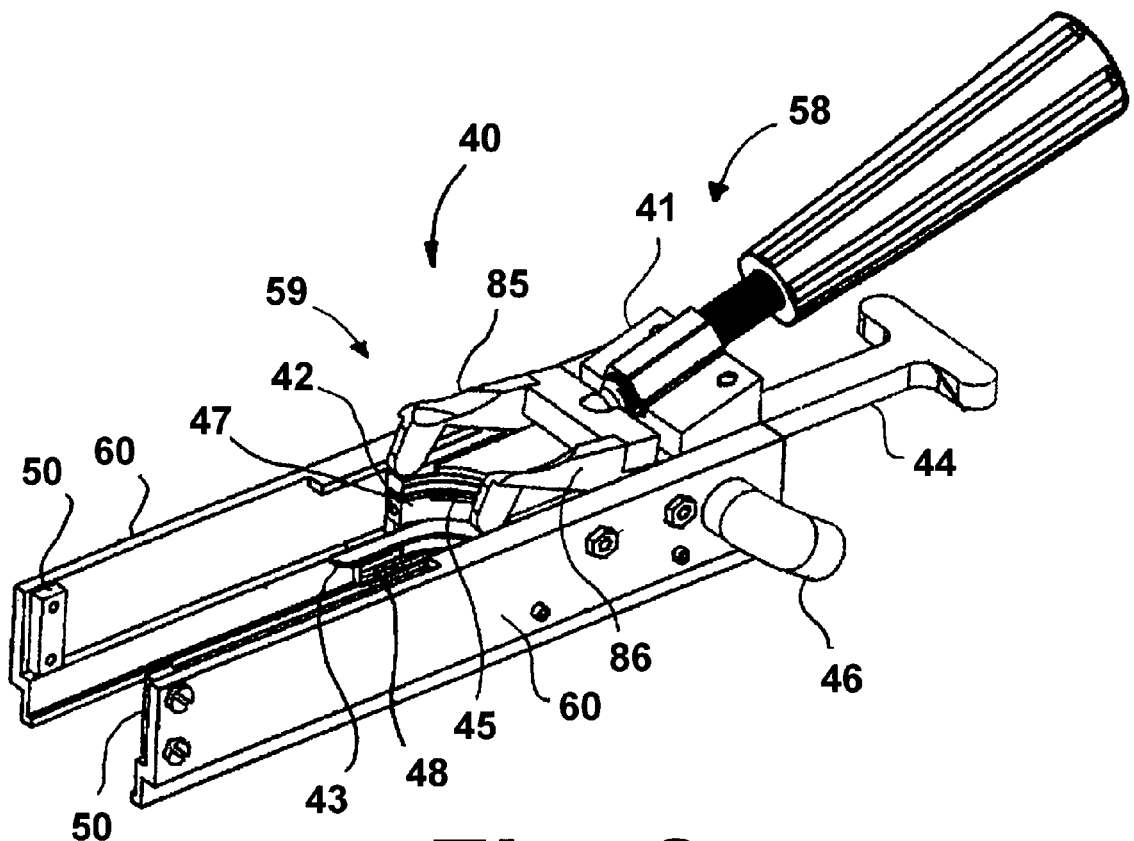
FIG. 8 is a perspective view of a handle half assembly in accordance with one embodiment of this invention.
Figure 11:
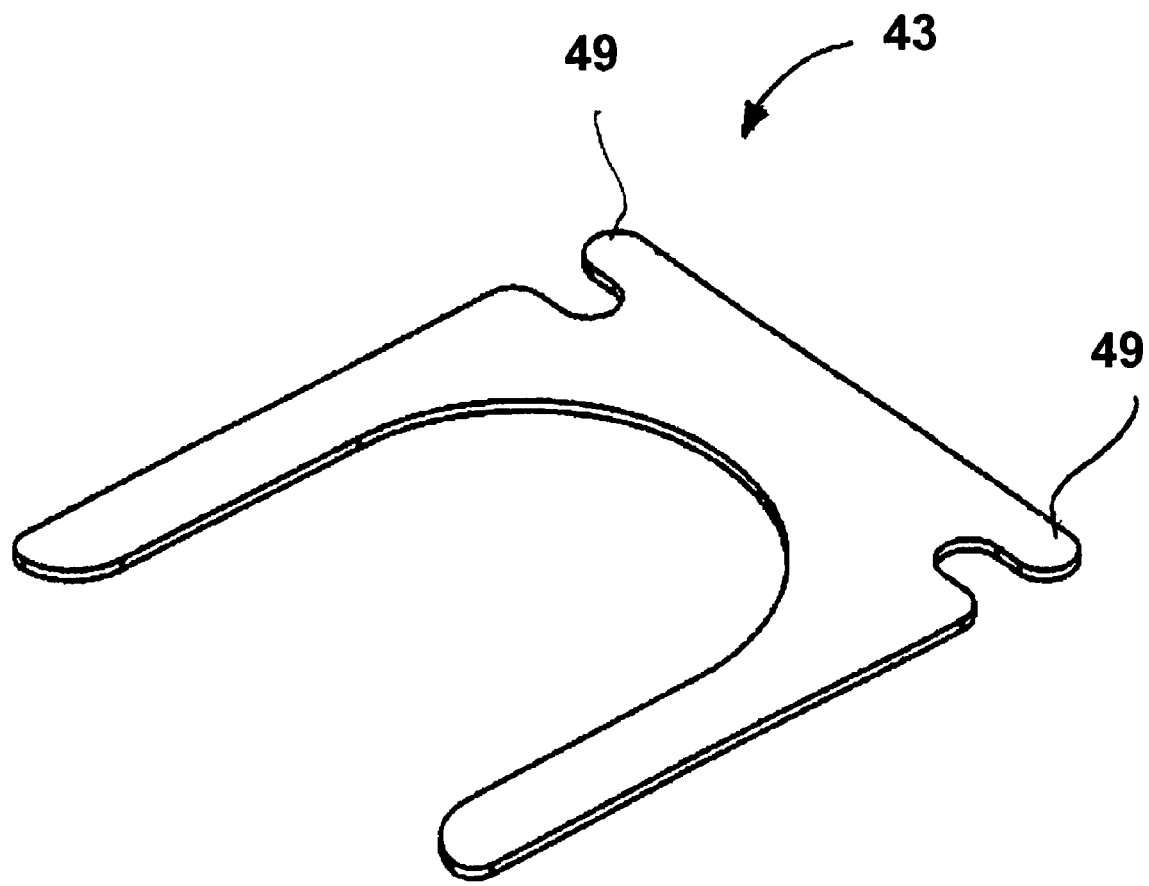
FIG. 11 is a perspective view of a gasket separator employed in the handle half assembly in accordance with one embodiment of this invention.
Figure 12:
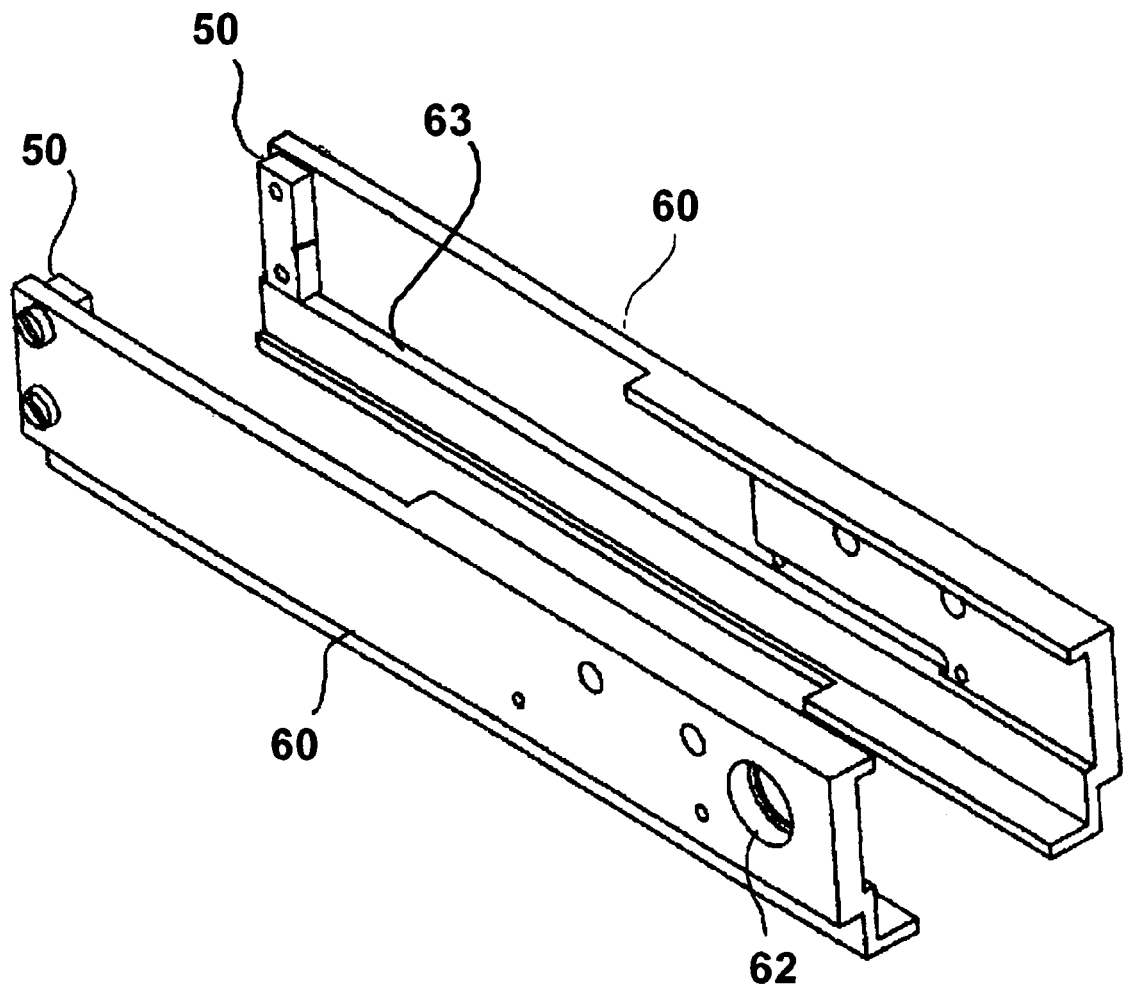
FIG. 12 is a perspective view of the bypass assembly sides in accordance with one embodiment of this invention.
Figure 13:
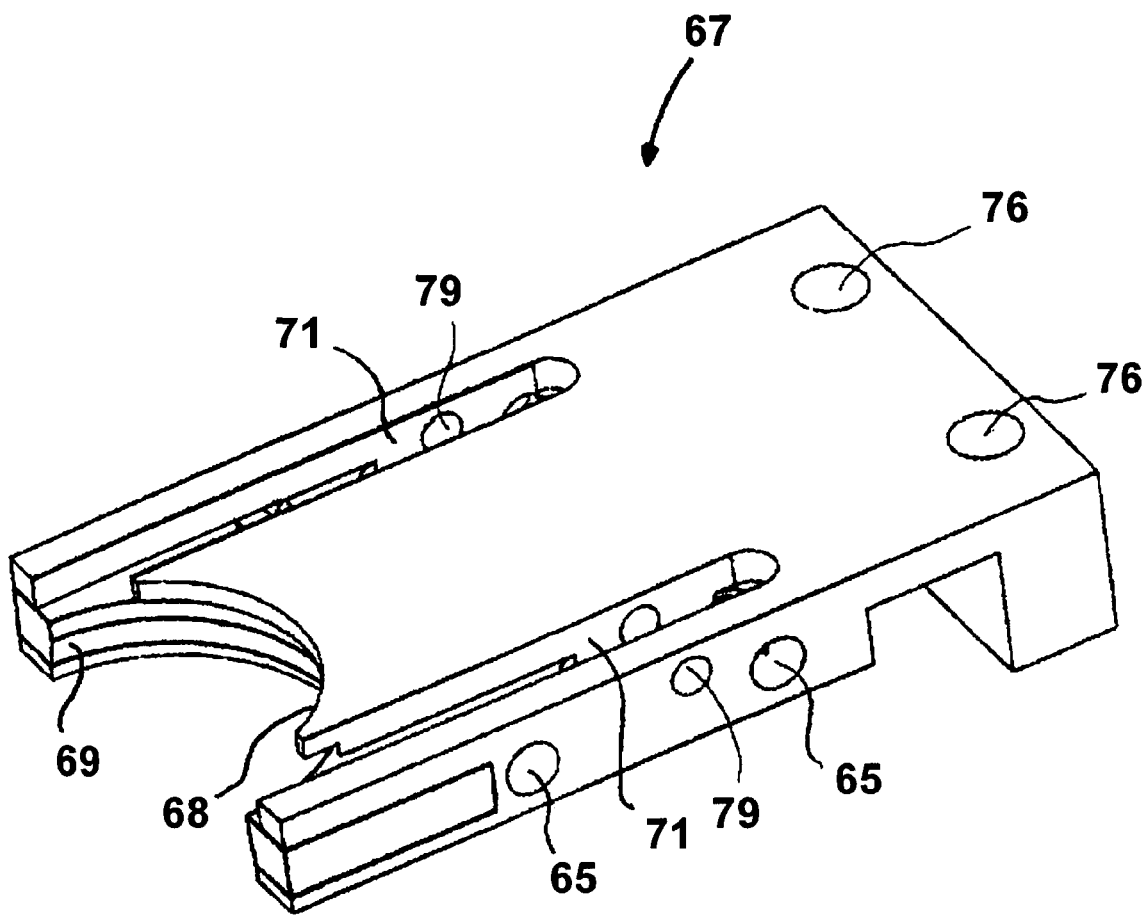
FIG. 13 is a perspective view of the upper section of the handle half assembly comprising a swivel seal in accordance with one embodiment of this invention.

The heart of the meter bypass assembly of this invention is the handle half assembly 40 shown in FIG. 8 disposed between and held together by bypass assembly sides 60 (FIG. 12). Handle half assembly 40, having a back end 58 and a front end 59, the latter end creating the front or second half of the full bore formed between the slide half assembly and the handle half assembly during the change out procedure, further comprises a plurality of individual components, each of which is described in detail herein below, stacked in order from top to bottom—swivelclamp 41 (FIGS. 15 and 16), handle half swivel seal 67 (FIG. 13), handle half slider 42 (FIG. 9), gasket separator 43 (FIG. 11), meter seal or threadclamp guide 73 (FIG. 14), and threadclamp 56 (FIG. 10).

The topmost component in the stack of components comprising the handle half assembly is the swivelclamp 41, which, during various stages of the change out procedure, compresses the swivel against the meter inlet and outlet openings, clamps the gasket separator and threadclamp guide together and, in general, controls the position of the gas meter relative to the swivels. In addition, the swivelclamp provides a handle for the fully assembled bypass assembly.

Figure 15:
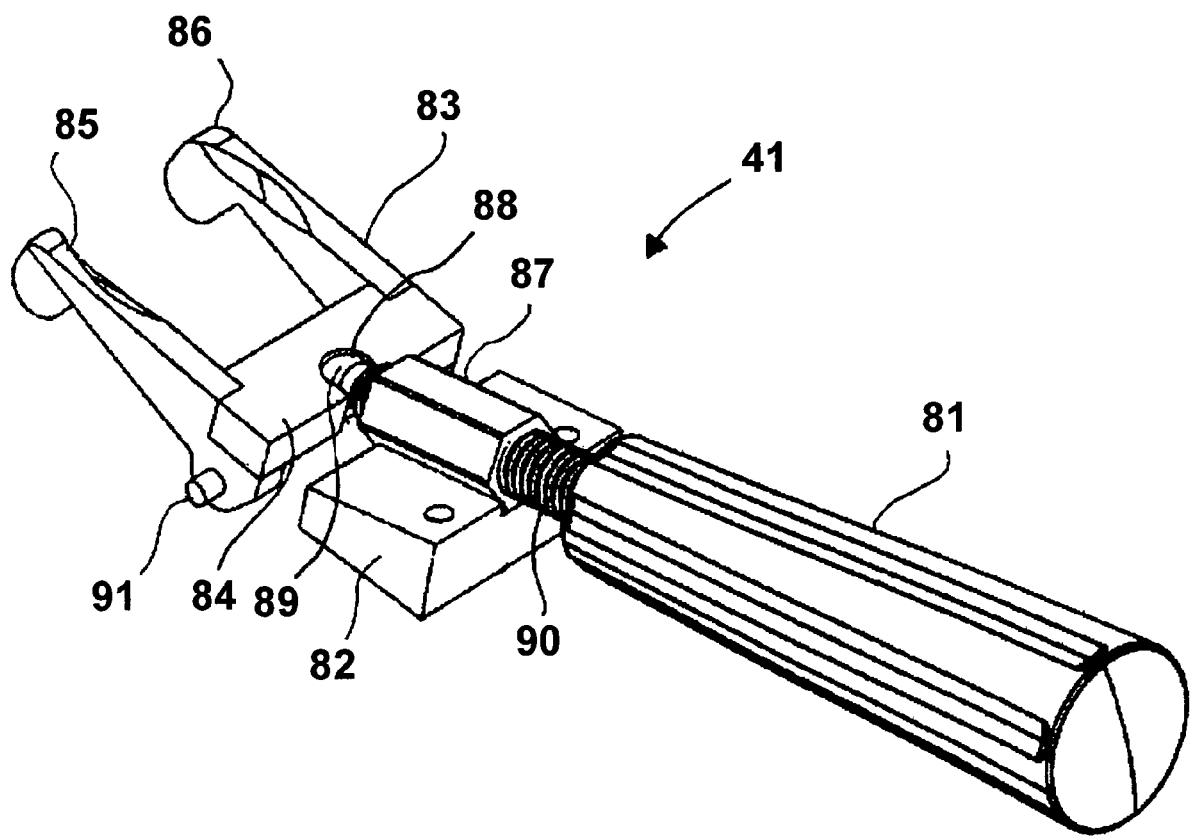
FIG. 15 is a perspective view of a swivelclamp employed in the handle half assembly in accordance with one embodiment of this invention.
Figure 16:
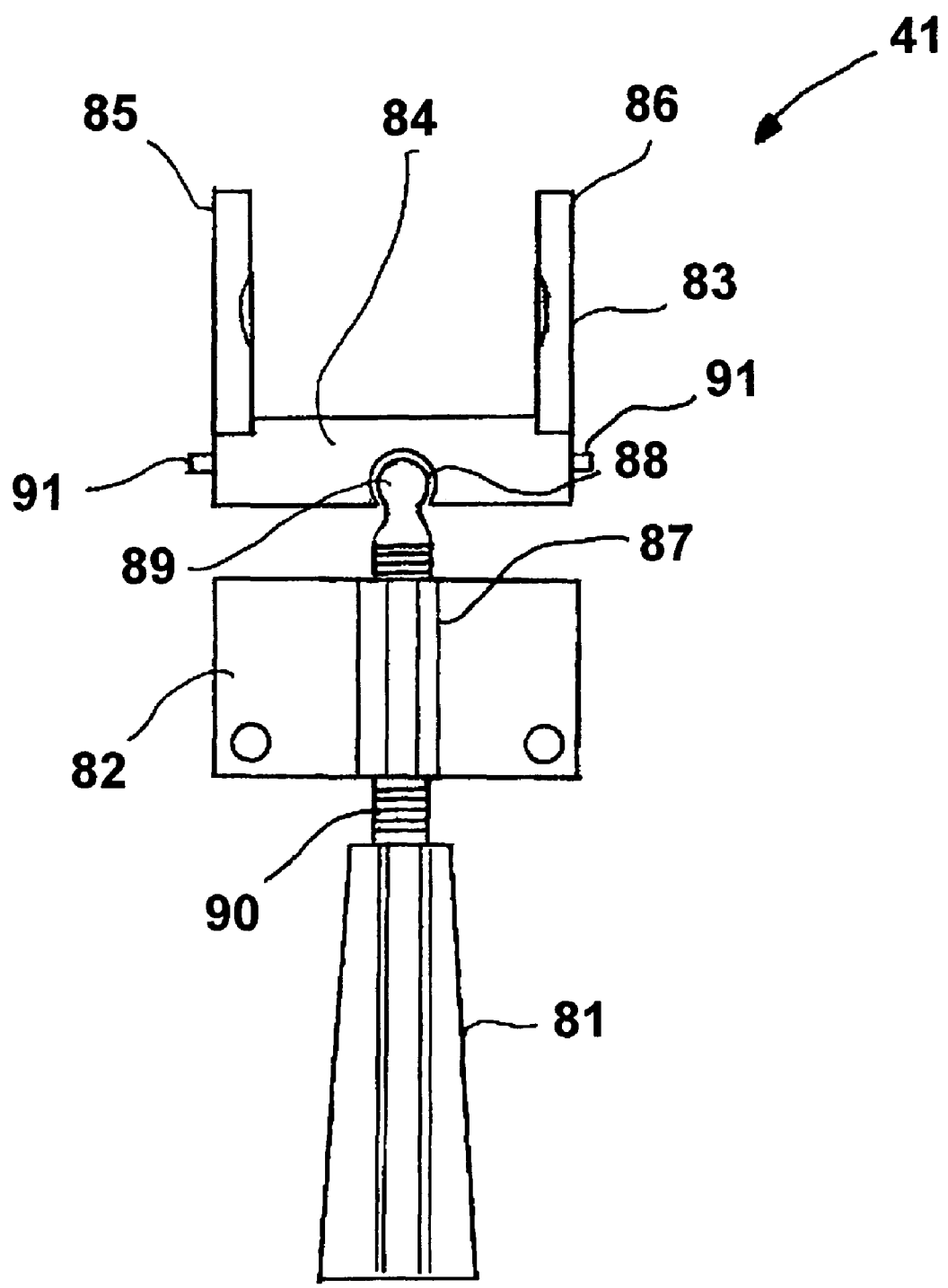
FIG. 16 is a top view of the swivelclamp of FIG. 15 in accordance with one embodiment of this invention.

Swivelclamp 41 comprises three basic components—handle 81, which is rotatable around a longitudinal handle axis, U-shaped swivelclamp clamp 83 comprising a base segment 84 connecting two substantially parallel leg segments 85, 86, and swivelclamp base or block 82 connecting handle 81 with U-shaped swivelclamp clamp 83—arranged such that rotating the handle 81 acts to raise or lower the U-shaped swivelclamp leg segments and swivel relative to the handle half or swivelclamp base 82. Swivelclamp base 82 forms a threaded throughbore 87 sized to receive the threaded portion 90 of swivelclamp handle 81. Connected with the end of the threaded portion 90 of swivelclamp handle 81 is a substantially spherical ball or knob 89. The base portion 84 of U-shaped swivelclamp clamp 83 forms a substantially vertically oriented partial throughbore 88 sized to receive knob 89. Extending laterally outward from base portion 84 of U-shaped swivelclamp clamp 83 are swivelclamp pivot pins 91 around which the swivelclamp clamp pivots as it is lowered onto and raised up from the swivel. As shown, for example, in FIG. 15, handle 81 is oriented at a downward angle with respect to U-shaped swivelclamp clamp 83. Thus, with the knob 89 engaged by partial throughbore 88, turning of the handle 81 in one direction threads the handle through the threaded throughbore on the swivelclamp clamp base segment 84, applying a forward force on knob 89 within partial throughbore 88, and causing the leg segments 85, 86 of U-shaped swivelclamp clamp 83 to be lowered. In this position, a downward force is applied to the swivel el 110, compressing the swivel against the meter opening. Turning handle 81 in the opposite direction releases the forward force on knob 89, causing the leg segments of the U-shaped swivelclamp clamp to be raised onto the swivel. In FIGS. 8, 15 and 20, the U-shaped swivelclamp clamp 83 is shown in the raised position and in FIGS. 21 and 23, the U-shaped swivelclamp clamp 83 is shown in the lowered position.

Disposed immediately below the swivelclamp in the stack of components comprising the handle half assembly is the handle half swivel seal 67, which roughly corresponds to the upper half of the handle half assembly. The lower half of the handle half assembly disposed beneath swivel seal 67 is handle half meter seal/threadclamp guide 73 which, when connected with the handle half swivel seal forms a substantially planar handle half cavity 70, sized to snugly receive handle half slider 42, shown in FIG. 9. Swivel seal 67 supports the swivelclamp, retains the handle half meter seal/threadclamp guide, locates and secures itself and the threadclamp guide to the bypass assembly sides, retains the swivel and seals the swivel connection when the bypass assembly is in bypass mode.

Swivel seal 67 has a back end corresponding to the back end 58 of handle half assembly 40 and a front end corresponding to the front end 59 of handle half assembly 40. Accordingly, the front end of the swivel seal forms a portion of the handle half assembly half bore, which portion comprises a swivel seal gasket 69, which seals against the swivel. The top surface of the swivel seal forms two spaced apart, parallel channels 71 oriented to receive the U-shaped swivelclamp clamp leg segments 85, 86 of the swivelclamp clamp 83 when the swivelclamp clamp is in its lowered position. The vertical walls of the channels form pivot pin openings 79 which receive swivelclamp pivot pins 91, thereby enabling the swivelclamp clamp to pivot between its raised and lowered positions as described herein above. It will be appreciated that partial or blind bores may be employed in place of the pivot pin openings. In the area disposed between the spaced apart channels, the top surface of the swivel seal extends slightly beyond the periphery of the handle half assembly half bore, creating a handle half retaining ledge 68 which, working in concert with the retaining ledge 20 of the slide half assembly, acts to prevent the swivel from exiting the bore when the bypass assembly is engaged around the swivel. The swivel seal gasket 69, which is preferably constructed of polyurethane, presses onto the swivel when the bypass assembly is in place around the swivel and is compressed when the swivel is raised against the retaining ledge. In this manner, the pressure pushes the swivel against the slide half swivel seal, thereby preventing gas from escaping when the bypass assembly is in a bypass mode.

Figure 17:
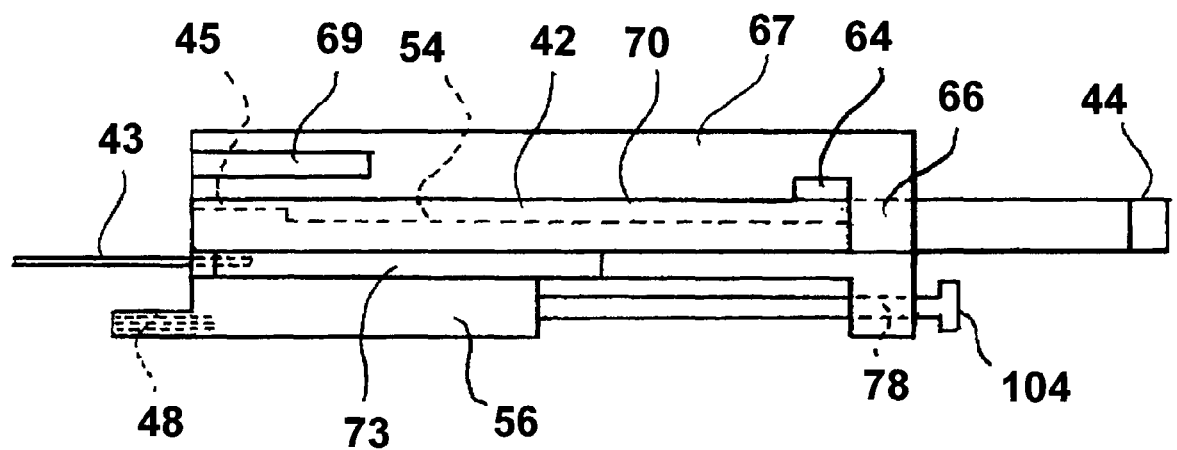
FIG. 17 is a lateral view of the handle half assembly, shown without the swivelclamp, in accordance with one embodiment of this invention.

The back end of the handle half swivel seal forms a channel 66 as shown in FIG. 17 that allows for the handle 44 of the handle half slider 42 to pass through for movement of slider 42 within the handle half assembly cavity 70. The surfaces of the handle half swivel seal defining channel 66 are covered with a gasket material (not shown) to provide a seal with the handle 44. In addition, the back end of the swivel seal forms a pair of vertically oriented throughbores 76 which are aligned with threadclamp throughbores 77 in threadclamp guide 73 shown in FIG. 14, whereby the swivel seal and threadclamp guide may be connected with each other. Alignment openings 65 of the handle half swivel seal 67 traverse the swivel seal, thereby enabling the swivel seal to be precisely located and connected with the bypass assembly sides 60.

Figure 10:
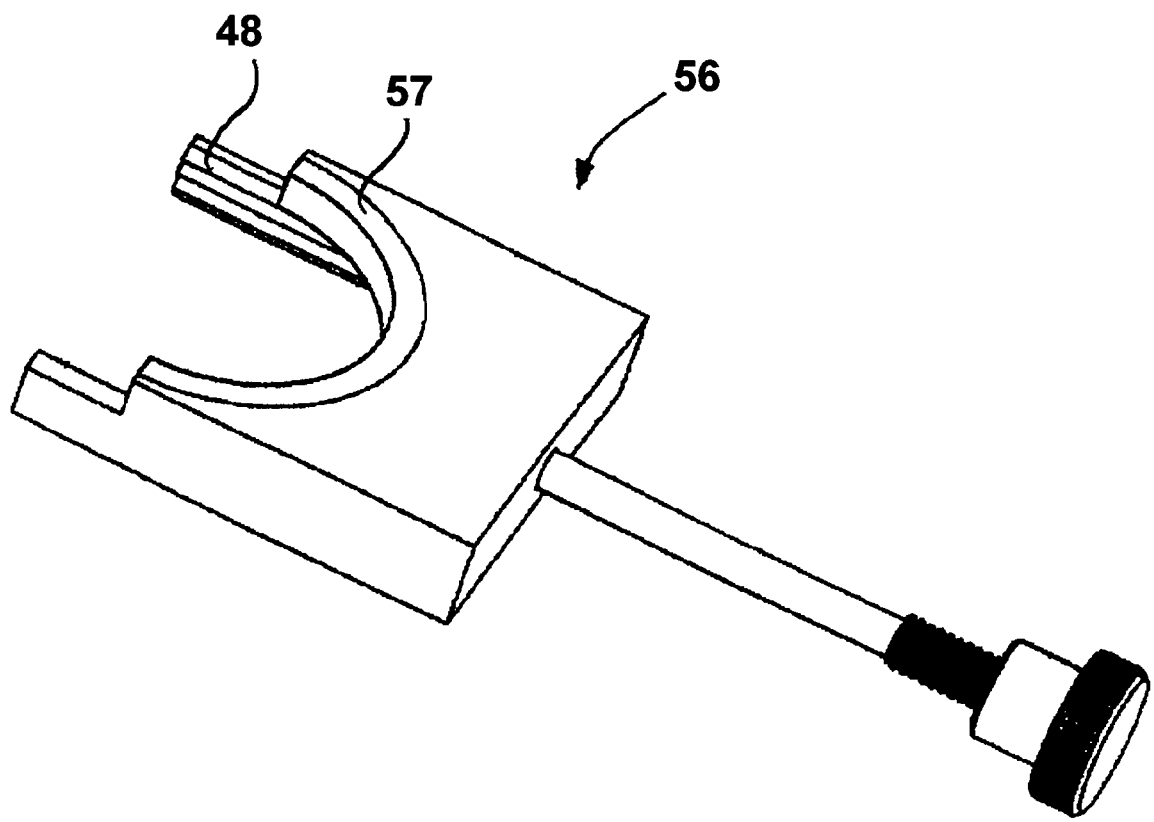
FIG. 10 is a perspective view of a threadclamp employed in the handle half assembly in accordance with one embodiment of this invention.
Figure 14:
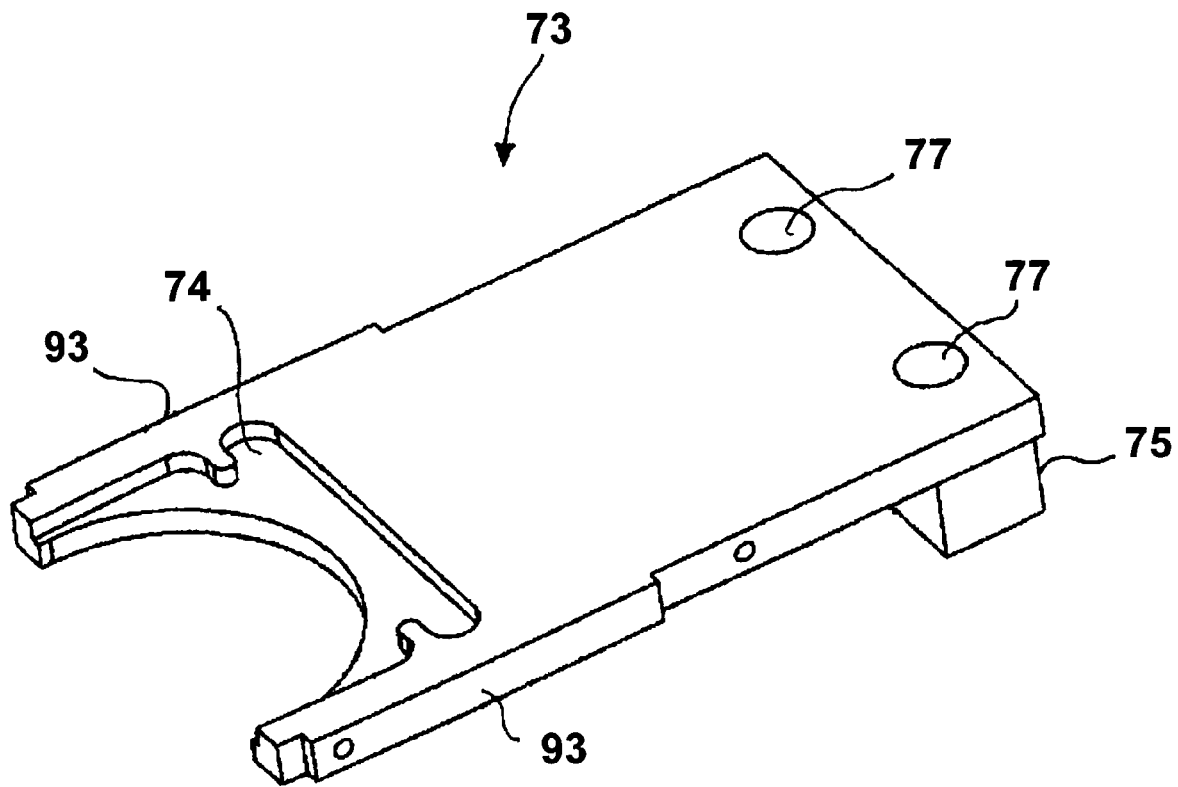
FIG. 14 is a perspective view of the lower section of the handle half assembly constituting a guide for the threadclamp shown in FIG. 10 in accordance with one embodiment of this invention.

Threadclamp guide 73, shown in FIG. 14, guides and locks threadclamp 56, shown in FIG. 10, retains gasket separator 43, shown in FIG. 11, aids in its alignment and the alignment of the handle half swivel seal with the bypass assembly sides 60 and seals against the handle half slider when the bypass is engaged. The back end of threadclamp guide 73 comprises a downward oriented extension 75 which forms a threaded throughbore 78, shown in FIG. 17, whereby the threadclamp can be locked when the meter is to be sealed and locked in place. At the front end of the threadclamp guide, the top surface of the guide forms a recess 74 for receiving and retaining gasket separator 43. As shown in FIG. 11, the back side of the gasket separator forms a pair of retaining elements 49, which conform to the shape of the recess, thereby enabling the gasket separator to be retained within the assembled handle half assembly. The depth of recess 74 is greater than the thickness of gasket separator, thereby allowing limited vertical movement of the gasket separator corresponding to the distance of about one (1) meter thread and guaranteeing that the tool can clamp onto the meter regardless of the thread start position. The sides of the threadclamp guide proximate the front end of the guide comprise laterally extending alignment pads 93 which mate with corresponding channels on the bypass assembly sides 60, thereby ensuring vertical alignment of the gasket separator and threadclamp guide when attached to the bypass assembly sides. It is important that the top surface of the threadclamp be smooth and true to ensure proper mating with the bottom of the handle half slider to stop the flow of gas to the meter during the bypass operation.

Figure 9:
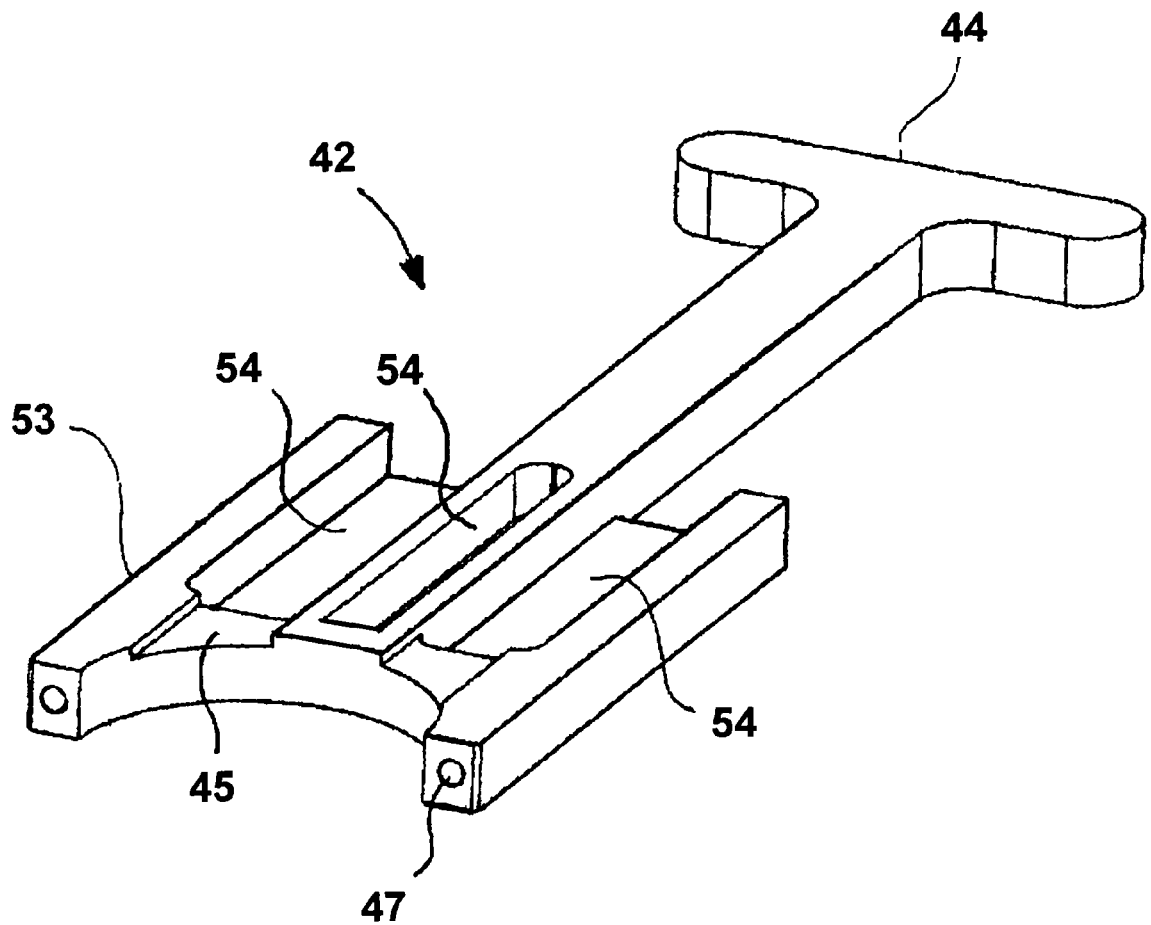
FIG. 9 is a perspective view of a handle half assembly inlet slider in accordance with one embodiment of this invention.

Handle half slider 42, shown in FIG. 9, is a substantially planar component comprising a bypass section 53 connected with a handle 44. Bypass section 53 is horizontally slidable within the substantially planar handle half cavity 70 formed between swivel seal 67 and threadclamp guide/meter seal 73 by means of handle 44, which extends beyond the back end 58 of the handle half assembly. The top surface of the bypass section of the slider forms at least one recess extending from the front edge to the back edge of the bypass section. In accordance with one preferred embodiment of this invention, the at least one recess includes a relatively shallow section 45, referred to as a purge port, at the front edge of the bypass section and a relatively deeper section 54, referred to as bypass ports, extending from the shallow recess to the back edge of the bypass section. In the operation of the bypass assembly, the slide simultaneously shuts off gas flow to the meter and enables bypassing of the gas around the meter. When the slider is in a bypass position, that is, when the handle is pushed into the bypass assembly, the gas flowing into the meter is diverted to flow through the bypass ports, thereby bypassing the meter.

As previously indicated, the leading end of the slider 42 mates with the slide half slider 18 such that when the handle is pushed into the bypass assembly, the slide half slider 18 is pushed toward the back end of the slider half assembly. To enable the slide half slider 18 to be returned to its initial position at the front end of the slide half assembly after completion of the meter change out operation, the edge of the handle half slider that mates with the slide half slider comprises retrieval magnets 47 that mate with the retrieval magnets 25 of the slide half slider.

Figure 31:
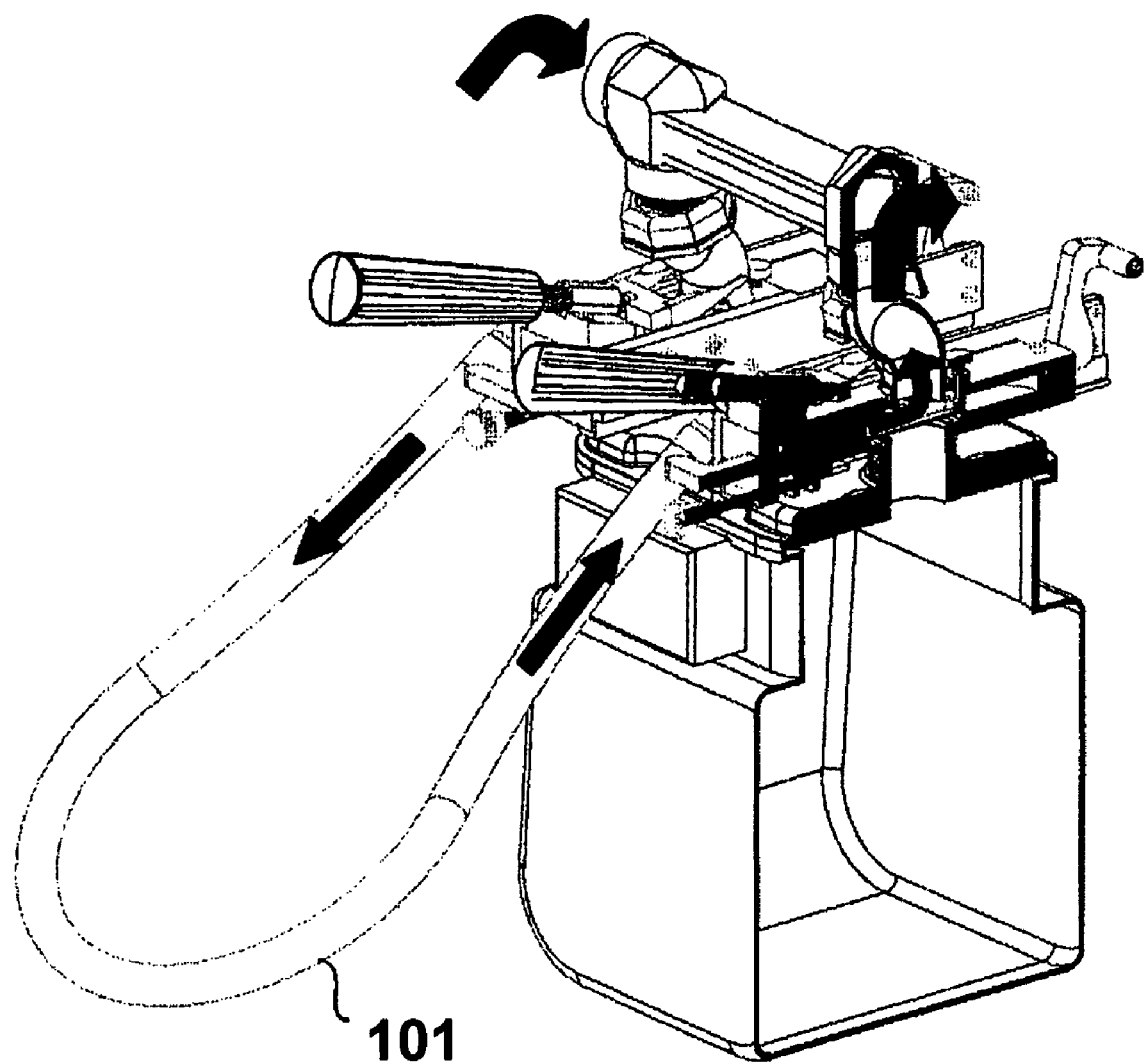
FIG. 31 is a diagram showing the flow of gas through the bypass provided by the bypass assembly of this invention.

As previously indicated, the bypass assemblies employed on the inlet and outlet sides of the meter are substantially identical except for some minor, but significant, structural differences. One of those differences is in the handle half sliders. In particular, the handle half slider of the bypass assembly employed on the meter inlet side comprises purge ports 45 which provide a passage for purge gas during purging of the assemblies and the bypass line. When the assemblies are first attached to the meter set, the handle half sliders of both the inlet and outlet bypass assemblies are positioned to permit gas to flow through the meter. When the swivel is separated from the meter, the purge ports of the inlet bypass assembly handle half slider allow a small amount of gas to be diverted from the inlet swivel through the inlet bypass assembly, through a bypass hose 101 connecting the inlet and outlet bypass assemblies as shown in FIG. 31, through the outlet bypass assembly and into the atmosphere. To enable the operator to control the flow of gas to the atmosphere, the outlet bypass assembly comprises a purge button (not shown) which, when pushed, establishes a fluid communication between the bypass ports of the outlet bypass assembly slider and the atmosphere. It is important that the slider of the outlet bypass assembly not have purge ports like the inlet bypass assembly slider so as to preclude the undesirable introduction of air into the customer's gas line during the purge process. When the bypass assemblies are in bypass mode, that is, when the handles of the handle half sliders of both bypass assemblies have been pushed completely forward, gas flows from the inlet swivel through the inlet bypass assembly bypass ports, through the bypass hose, into the outlet bypass assembly, through the bypass ports of the outlet bypass assembly and into the outlet swivel for delivery to the customer. The bottom of the handle half sliders acts as a sealing surface which is pressed into the slider half meter seal and the handle half meter seal, requiring that the bottom surface be smooth and true.

Disposed immediately below the threadclamp guide in the stack of components comprising the handle half assembly is the threadclamp 56 shown in FIG. 10. Threadclamp 56 comprises a substantially planar member having a front side, a back side, and two tiers. The upper tier forms the bottom of the handle half assembly half bore, which bottom portion of the half bore is lined with a resilient gasket material 57. The bottom tier comprises opposed longitudinally extending sides, each side having an inward facing surface having threads 48 adapted to mate with the meter threads of the gas meter during portions of the meter change out process. The back side of the member is connected with the front end of a control rod, which extends through the threaded throughbore 78 formed by the downward extension 75 of threadclamp guide 73. The back end of the control rod is threaded and engages the threads of the threaded throughbore 78 when the threadclamp is disposed around the meter threads. Turning of the control knob in one direction moves the tiered member toward the back end of the handle half assembly while turning it in the opposite direction moves the tiered member toward the front end of the handle half assembly.

One side of each of the inlet and outlet bypass assemblies employed in the change out procedure forms bypass a port 62 as shown in FIG. 12 and fluid communication means for conveying the bypass gas from the inlet bypass assembly to the outlet bypass assembly. In accordance with one embodiment of this invention, the fluid communication means comprises hose 101 connecting with the bypass ports by means of a connector 46, shown, for example, in FIG. 31. In addition, the bypass assembly side of the outlet bypass assembly opposite to the bypass assembly side having the port 62 comprises gas release means, such as a valve, for enabling the release of gas to the atmosphere.

To enable purging of the bypass assemblies of this invention, the bottom surface of the handle half swivel seal forms a bypass purge channel 64 proximate the back end of the swivel seal as shown in FIG. 17. This bypass purge channel is in fluid communication with purge ports 45 and in fluid communication with bypass ports 62 and the gas release means. It also serves to increase the flow capacity during bypass by allowing the gas to flow around the handle.

Figure 22:
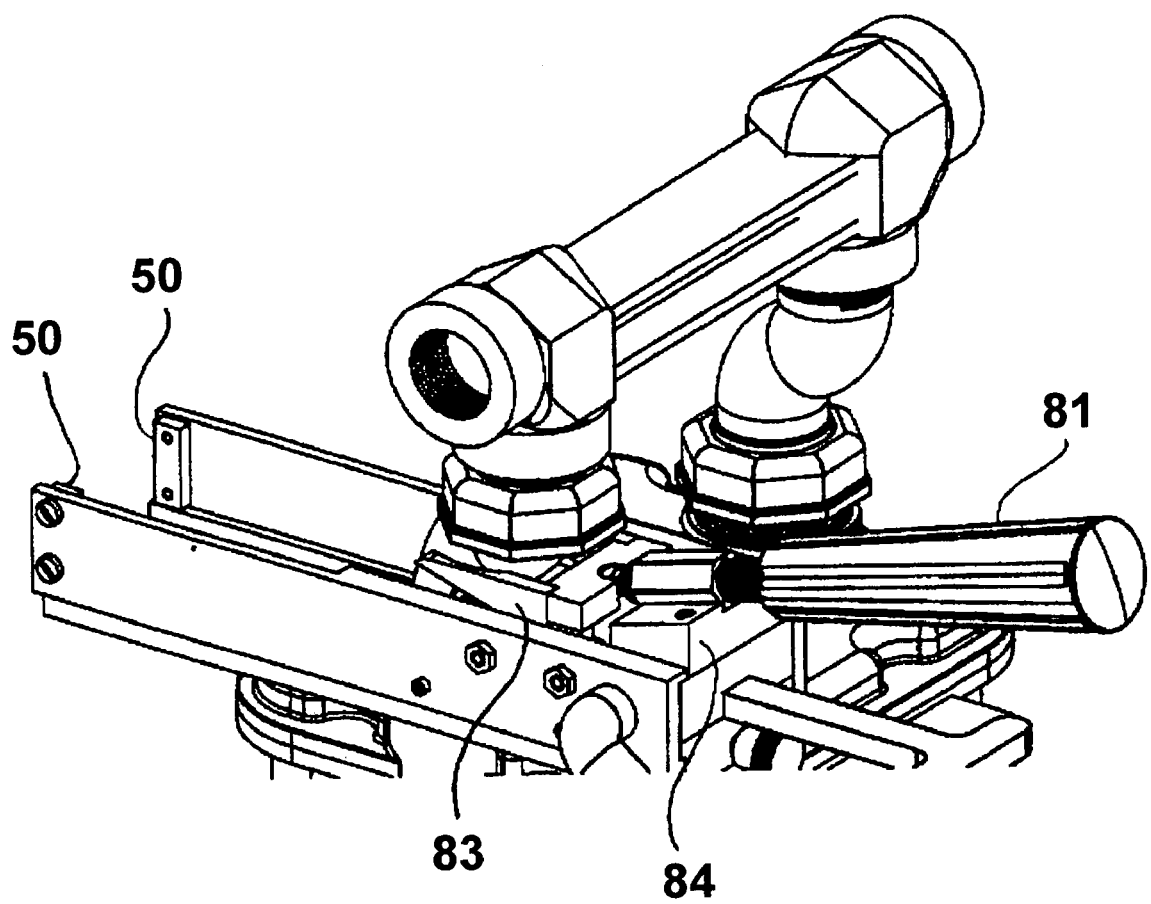
FIG. 22 is a perspective view showing a handle half assembly disposed around a swivel with the swivelclamp clamp raised.

Referring to FIGS. 18-31, the procedure for performing a meter change out employing the bypass assemblies of this invention will now be described. Initially, the meter 95 is connected to a meter set comprising a meter bar 105 having a gas inlet end 106 and a gas outlet end 107 by swivels 96. The swivels are connected to the gas meter by means of nuts 98 threaded onto the inlet and outlet meter threads 99 as shown in FIG. 18. The first step in the process is to unscrew the nut connecting the gas inlet swivel with the threaded gas meter inlet, thereby exposing the gasket 100 disposed between the end of the swivel and the meter inlet opening as shown in FIG. 19. Although the nut has been unscrewed, the gas meter remains suspended in place, with little, if any, gas leaking from the inlet side of the meter, by virtue of the connection of the threaded gas meter outlet and the outlet swivel. Once the inlet side nut has been removed, the handle half assembly including the bypass assembly sides and with the swivelclamp clamp in its raised position is positioned around the inlet swivel and inlet meter threads as shown in FIG. 20. Threads 48 of the threadclamp 56 engage with the meter threads 99 to secure the meter inlet against the gasket 100 and the gasket separator 43. When properly positioned around the inlet swivel, the gasket materials of the handle half swivel seal and the handle half meter seal compress against the outer surface of the swivel and the meter threads, respectively. Care is required to ensure that the gasket separator 43 is positioned between the swivel 96 and the gasket 100. At this point in the procedure, the swivelclamp handle is rotated, lowering the swivelclamp clamp from its raised position as shown in FIGS. 20 and 22 onto the swivel until pressure is applied to the swivel el 110 (shown, for example, in FIGS. 19 and 21). This downward pressure is opposed by the threadclamp and results in a clamping force between the meter itself and the swivel el with the gasket and gasket separator sandwiched in-between.

Figure 23:
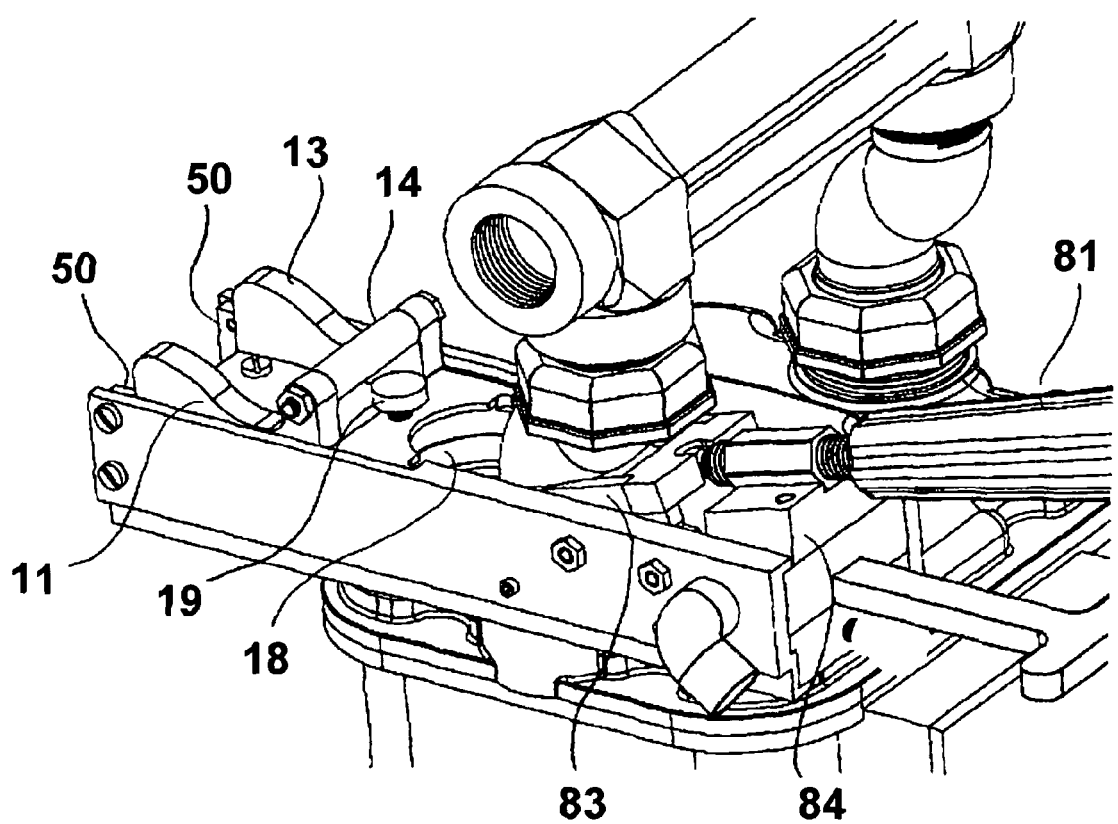
FIG. 23 is a diagram showing the disposition of the slide half assembly in the bypass assembly prior to locking.
Figure 24:
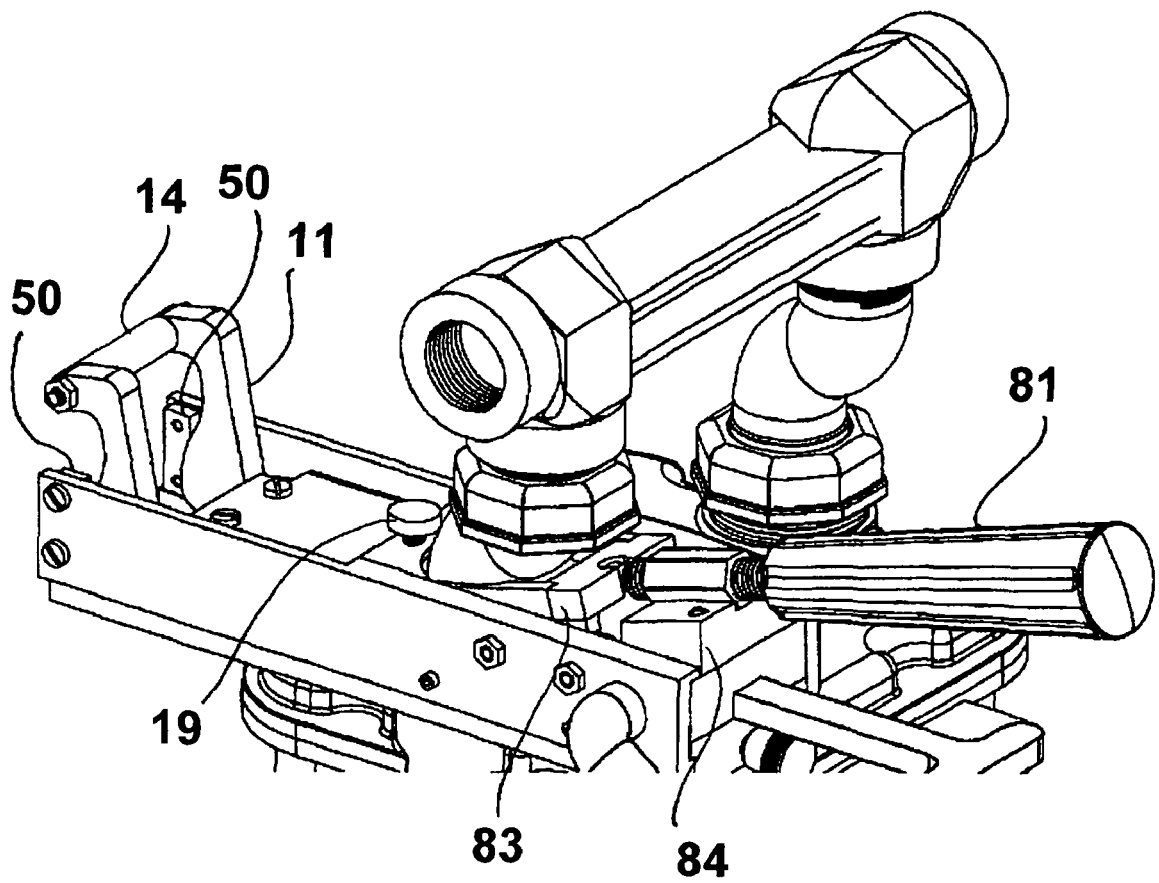
FIG. 24 is a diagram showing the slide half assembly locked against the handle half assembly in accordance with one embodiment of this invention.
Figure 25:
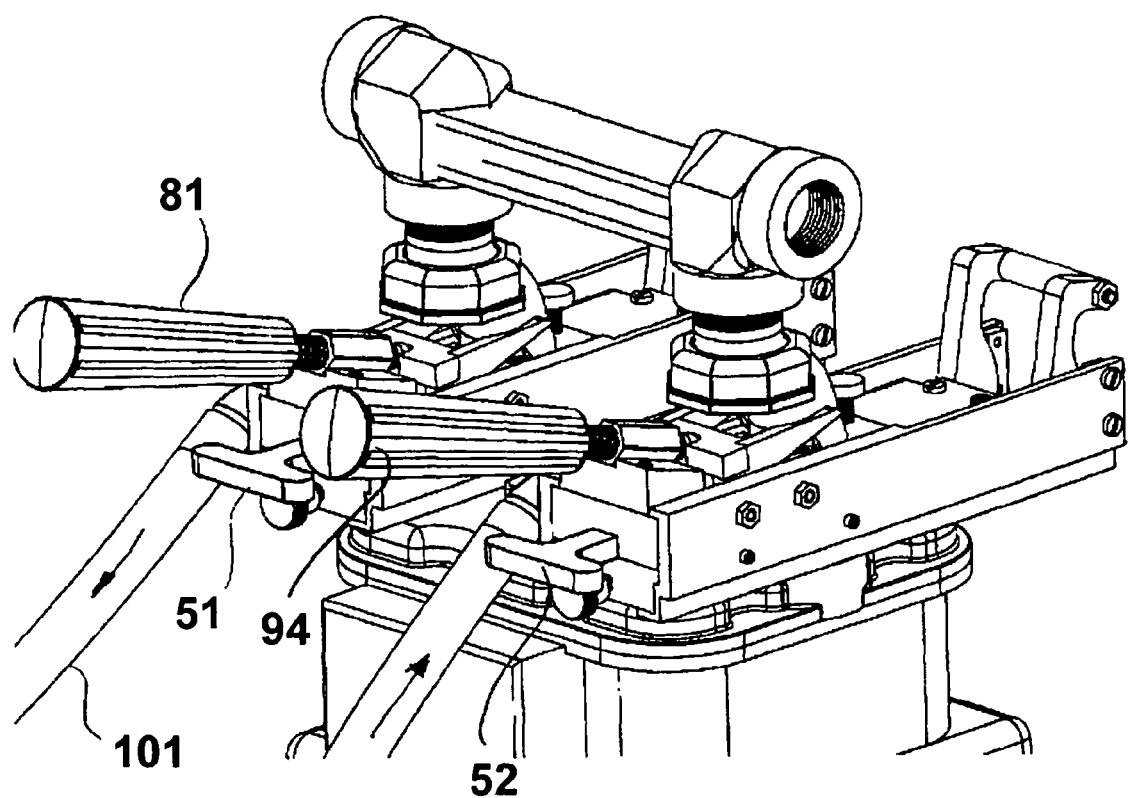
FIG. 25 is a diagram showing the bypass assemblies in accordance with one embodiment of this invention in place around both the gas inlet and gas outlet swivels with the bypass sliders in a bypass position.
Figure 26:
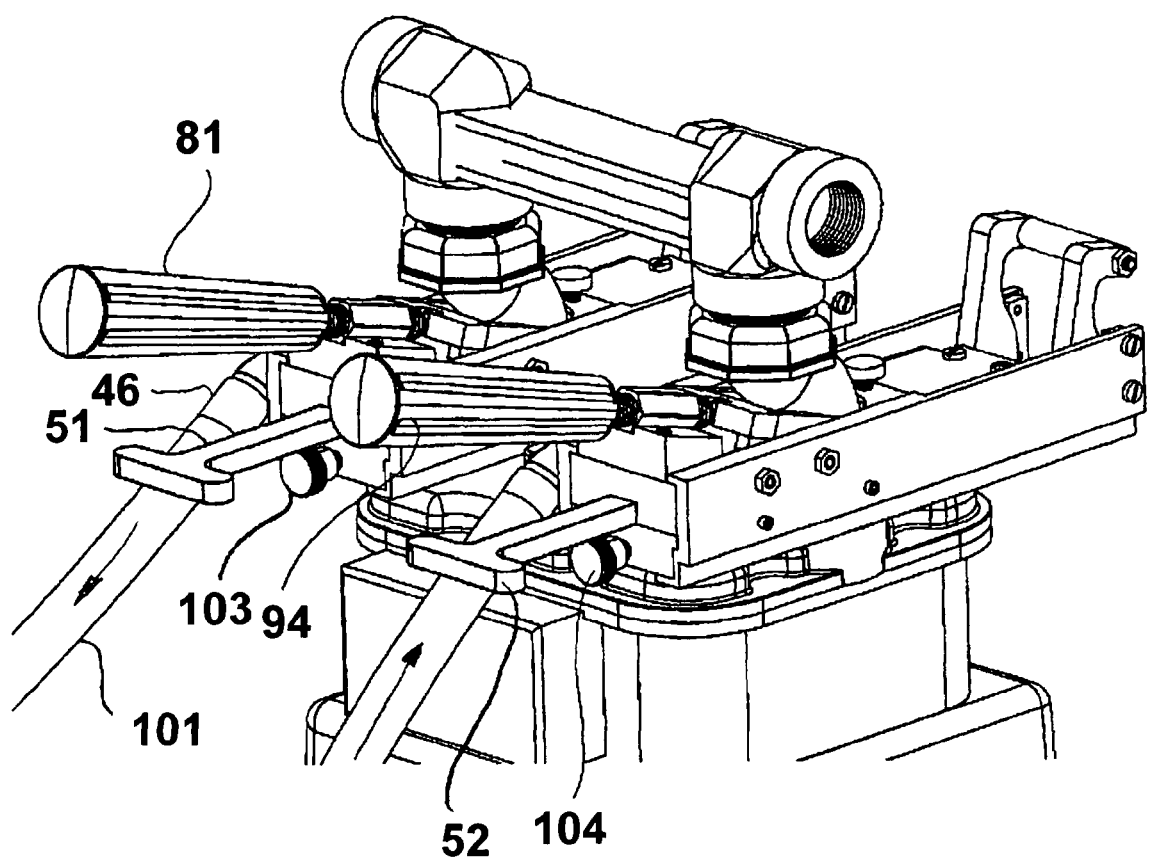
FIG. 26 is a diagram showing the bypass assemblies in accordance with one embodiment of this invention in place around both the gas inlet and gas outlet swivels with the bypass sliders in a non-bypass position.
Figure 30:
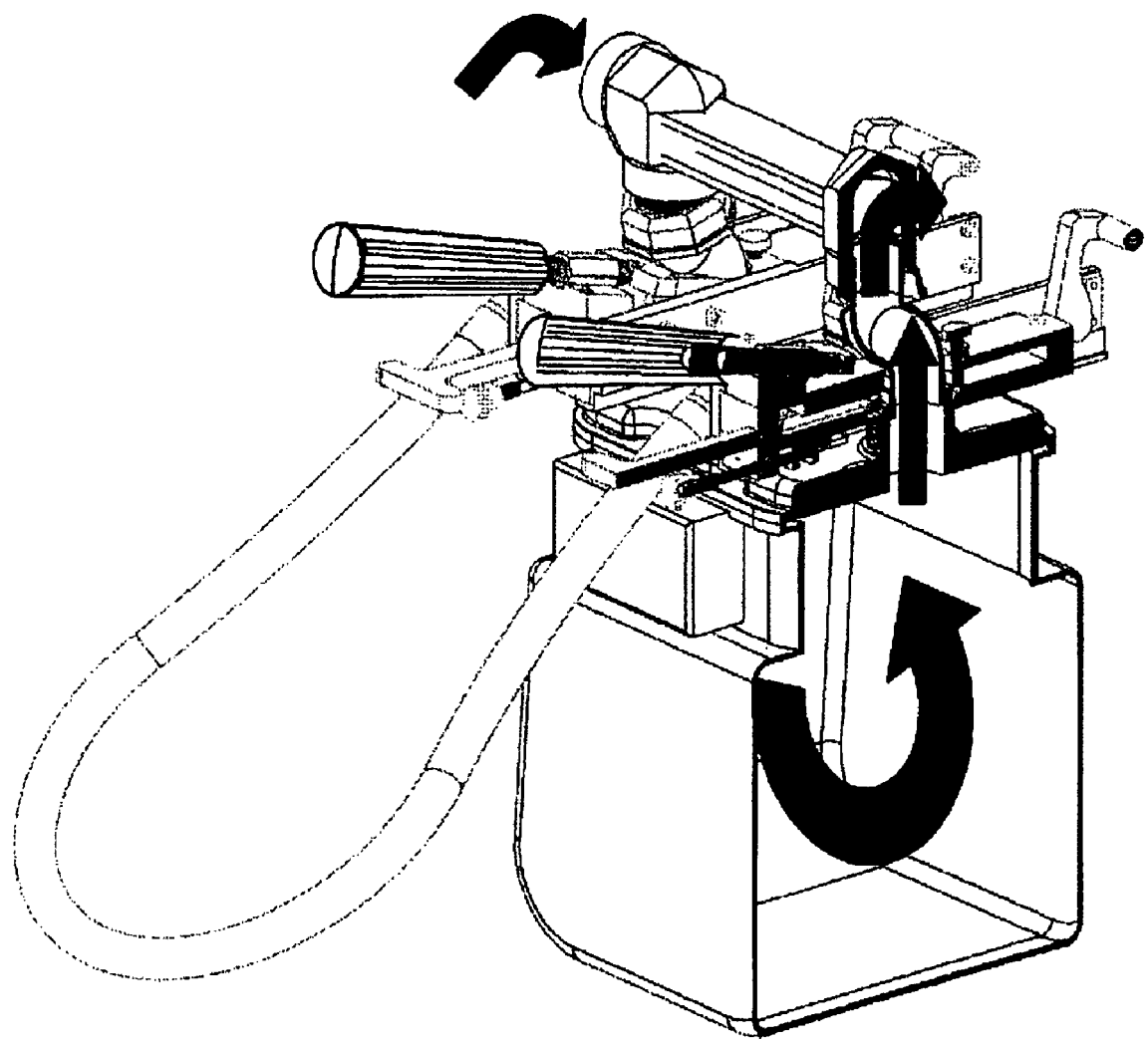
FIG. 30 is a diagram showing the flow of gas with the bypass assemblies of this invention attached to a meter set prior to implementation of the bypass.

The next step in the process is the insertion of the slide half assembly between the bypass assembly sides as shown in FIG. 23 followed by pivoting of the camlock from its unlocked position, shown in FIG. 23, to its locked position, shown in FIG. 24. Pivoting the camlock to its locked position forces the slide half assembly forward into the handle half assembly, thereby creating a full bore sealing around both the meter threads and the swivel. With the inlet bypass assembly in place, the same procedure is followed with the outlet bypass assembly, after which hose 101 is connected with the gas outlet port of the inlet bypass assembly and the gas inlet port of the outlet bypass assembly as shown in FIG. 26. Bypass lock 19 is disposed within bypass lock receiver bore 34 of slider half slider 18 so as to align the slider with the front end of the slider half assembly and gas flow is still through the meter as shown in FIG. 30.

Figure 27:
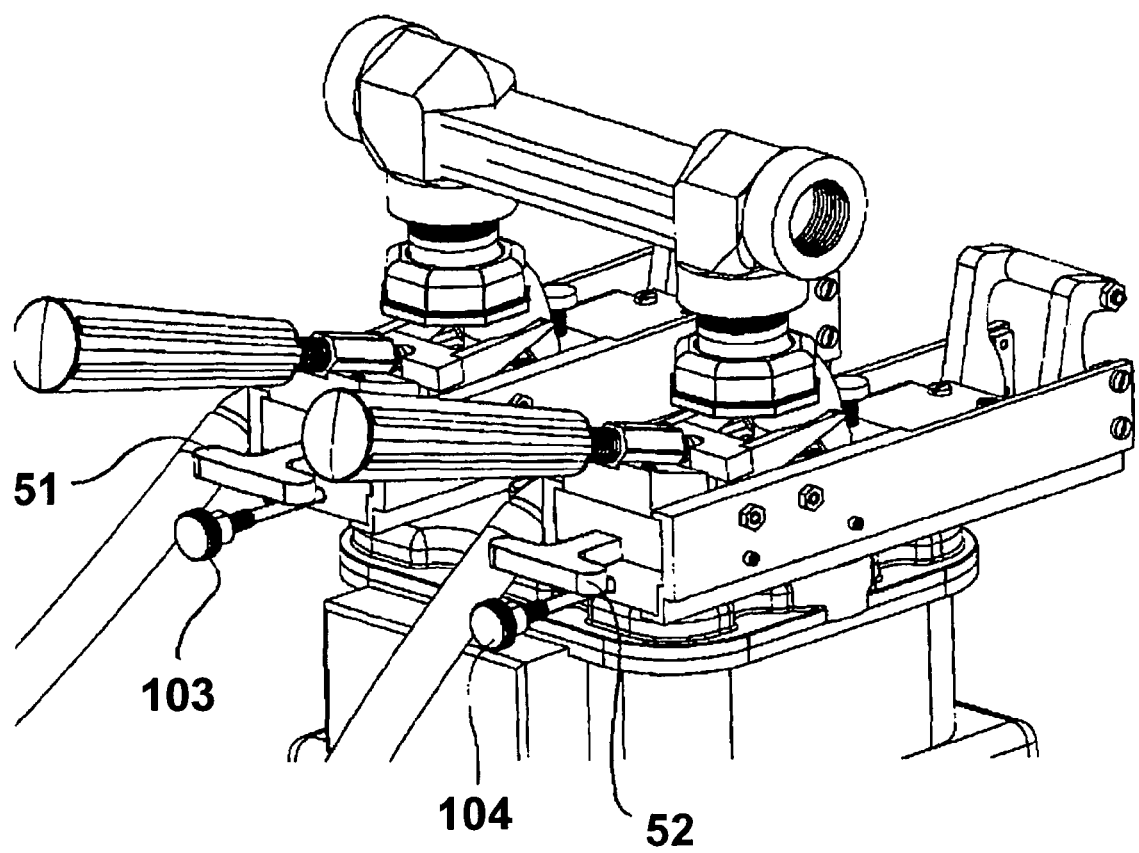
FIG. 27 is a diagram showing the bypass assemblies in accordance with one embodiment of this invention in place around both the gas inlet and gas outlet swivels with the threadclamps in a meter removal position.

At this point in the meter change out process, both of the handle half assembly handles are rotated to release the swivelclamps as shown in FIG. 27 which, in turn, enables the meter to be separated from the swivels together. The swivels are stopped by the retaining ledges of the handle half swivel seal and the slider half swivel seal. At this point in the process, the flow of gas is through the inlet swivel, through the full bore formed by the inlet bypass assembly and into the inlet bypass assembly. The swivel seal gasket and the slider half swivel seal with minimal, if any leakage, provide containment of substantially all of the gas. The meter is then lowered, but not removed, to enable purging of the bypass assemblies. Purging is carried out by allowing the gas to flow through the purge ports 45 on the inlet bypass assembly's slider. The gas flows through the purge ports, through the inlet bypass assembly, through the bypass hose, and through the outlet bypass assembly into the atmosphere. Purging is carried out for about 15 seconds to ensure the removal of any air in the assemblies. Thereafter, the bypass locks 19 are removed from the bypass lock receiver bores as a result of which the slider half sliders are free to move.

With both slider half sliders free to move, both handle half slider handles 44 are simultaneously pushed forward as a result of which all of the gas will flow exclusively through both bypass assemblies as shown in FIG. 31. As previously indicated, the bottom surfaces of the handle half sliders create a seal that does not allow any gas to escape to the bottom of the assemblies into the meter. As a precaution, the handles of the swivelclamps are again rotated to lower the swivelclamp clamps, thereby locking the swivels onto the tops of the sliders. In so doing, the assemblies are stabilized around the swivels, limiting the chances for leaks and movement of the tools around the swivels.

Figure 28:
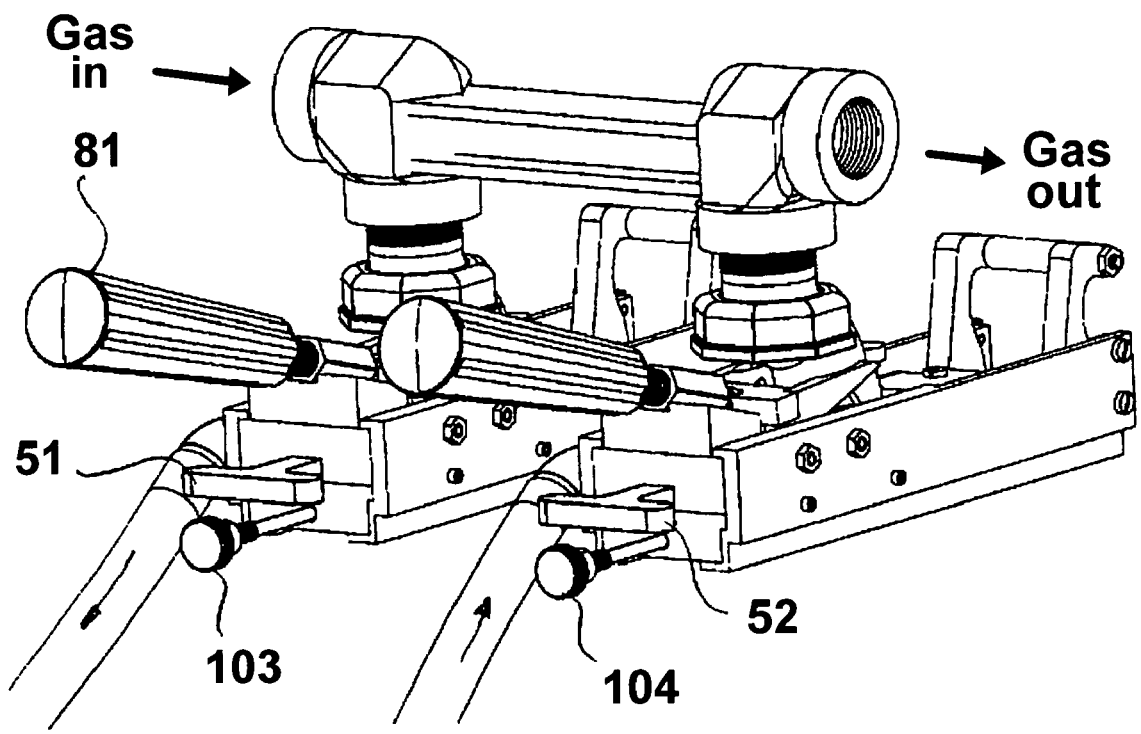
FIG. 28 is a perspective view of the bypass assemblies with the meter removed.

With both bypass assemblies in place, the threadclamp handle is rotated to disengage the threadclamp from the meter threads and break the seals around the meter threads maintained by the handle half thread gasket. Pulling the threadclamp handle completely back until it stops as shown in FIG. 28 fully disengages the meter from the tool, thereby enabling removal of the meter. The swivel gaskets will either fall out or remain in the bottom of the bypass assemblies. In either case, the gaskets are replaced upon installation of the new meter.

To install a new meter, the steps for removal of the meter are essentially carried out in reverse. In particular, after bringing the meter and gaskets up to the swivels, the threadclamps are pushed into the bypass assemblies to engage the meter threads and seal around the meter threads. The meter is then purged by partially pulling, typically about ½ inch, the inlet bypass assembly slider and partially unthreading the outlet bypass assembly threadclamp (about two (2) turns of the threadclamp rod). By partially pulling back on the inlet bypass assembly slider, gas is allowed to pressurize the meter and flow through the bypass hose. By partially unthreading the outlet bypass assembly threadclamp, the seal around the meter threads is broken, permitting a limited amount of gas to flow through the inlet bypass assembly, the meter and into the atmosphere outside the outlet bypass assembly. After the meter dials make the correct amount of rotations, there is no longer any air in the meter and the outlet bypass assembly threadclamp can then again be tightened to reform the seal around the meter threads.

With the meter fully purged, sealed and locked into place by the bypass assemblies, the bypass assemblies can be disengaged. First, both swivelclamps are unlocked resulting in the swivels resting on the respective retaining ledges. Both handle half sliders are pulled back together. Due to the retrieval magnets, the slider half sliders are also pulled back with the handle half sliders. The bypass locks are then re-engaged with the bypass lock receiver bores to lock the slider half sliders in place. Thereafter, the handle half handles are rotated to lower the swivelclamps onto the swivels and raise the meter into place. It is important that the handles be rotated as far as possible to ensure proper seating of the new gaskets on the swivels. With both bypass assemblies tightly clamped, the outlet bypass assembly can be removed by releasing the camlock, removing the slide half assembly, unlocking the outlet bypass assembly swivelclamp, and removing the assembly, leaving the meter supported by the inlet bypass assembly. After tightening the nut around the outlet meter threads, the inlet bypass assembly is then removed and the nut around the inlet meter threads tightened. Throughout this entire procedure, gas flow to the consumer is maintained thereby obviating the need to entire the premises of the consumer to relight pilot lights.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for non-interruptible change out of a gas meter comprising:
   a bypass assembly having a first half assembly and a second half assembly disposed between opposed side walls;
   said first half assembly having a first half assembly upper section connected with a first half assembly lower section, forming a first half assembly substantially planar cavity therebetween, and having a first half assembly front end forming a first vertical half bore extending from a first half assembly top to a first half assembly bottom, a first half assembly back end, and opposed first half assembly sides;
   said second half assembly having a second half assembly upper section connected with a second half assembly lower section, forming a second half assembly substantially planar cavity therebetween, and having a second half assembly front end forming a second vertical half bore extending from a second half assembly top to a second half assembly bottom, and a second half assembly back end, said second half assembly front end mateable with said first half assembly front end to form a full bore;
   locking means for locking said first half assembly front end against said second half assembly front end;
   a substantially planar slider element sized to snugly fit within said first half assembly substantially planar cavity, said slider element slidable between said first half assembly front end and said first half assembly back end and having a first half assembly front end facing side having a concave shape corresponding to said first vertical half bore; and
   slider locking means for preventing said slider element from sliding within said substantially planar cavity.

2. An apparatus in accordance with claim 1, wherein said first half assembly front end forms a horizontally oriented gasket separator slot below said slider element.

3. An apparatus in accordance with claim 2, wherein a first half assembly top surface of said first half assembly upper section at said first half assembly front end extends beyond a perimeter of said first half bore, forming a first half assembly front end extension.

4. An apparatus in accordance with claim 3, wherein a bottom portion of said full bore below said gasket separator slot is lined with a resilient gasket material.

5. An apparatus in accordance with claim 2, wherein said second half assembly comprises, from top to bottom, a swivelclamp, a second half assembly swivel seal, a horizontally slidable bypass slider, a U-shaped gasket separator, a threadclamp guide, and a threadclamp.

6. An apparatus in accordance with claim 1, wherein said locking means comprises a pair of opposed stops connected with a first half assembly end of said bypass assembly side walls.

7. An apparatus in accordance with claim 6, wherein a bottom edge of each said bypass assembly side wall forms an inwardly facing ledge.

8. An apparatus in accordance with claim 7, wherein said first half assembly is horizontally slidable between said bypass assembly side walls, supported by said inwardly facing ledges from said stops to said second half assembly front end.

9. An apparatus in accordance with claim 8, wherein said locking means further comprises a camlock pivotably connected with said first half assembly, said camlock pivotable between an unlocked position whereby said first half assembly is horizontally slidable between said side members and a locked position whereby said camlock contacts said opposed stops, forcing said first half assembly front end against said second half assembly front end.

10. An apparatus in accordance with claim 4, wherein a top portion of said full bore below said first half assembly front end extension is circumferentially lined with an additional resilient gasket material.

11. An apparatus in accordance with claim 9, wherein said swivelclamp comprises a swivelclamp base member having a swivelclamp handle side, an opposite swivelclamp clamp side, and forming a threaded throughbore disposed at a downward angle in a direction of said swivelclamp clamp side, a swivelclamp handle having a threaded end threaded through said threaded through bore, said threaded end having a substantially spherical ball integrally connected therewith, and a U-shaped swivelclamp clamp having a base section forming a partial, substantially vertical throughbore adapted to received said spherical ball and having two parallel leg sections oriented in a direction of said full bore.

12. An apparatus in accordance with claim 5, wherein said second half assembly upper section comprises said second half assembly swivel seal, said second half assembly swivel seal having a swivel seal front end forming a portion of said second half bore, having a swivel seal top surface extending beyond a perimeter of said second half bore, forming a second half assembly front end extension.

13. An apparatus in accordance with claim 12, wherein said swivel seal top surface forms two parallel channels parallel to said second half assembly sides, one of said channels disposed on each side of said second half assembly front end extension, said channels sized to receive said leg sections of said U-shaped swivelclamp clamp upon downward pivoting of said swivelclamp clamp.

14. An apparatus in accordance with claim 5, wherein said horizontally slidable bypass slider is disposed within and sized to snugly fit within said second half assembly substantially planar cavity, said horizontally slidable bypass slider slidable from said second half assembly back end into said first half assembly substantially planar cavity.

15. An apparatus in accordance with claim 5, wherein said second half assembly lower section comprises said threadclamp guide, a top surface of said threadclamp guide forming an indentation adapted to receive a retainer portion of said gasket separator whereby said gasket separator is maintained between said horizontally slidable bypass slider and said threadclamp guide and aligned with said gasket separator slot.

16. An apparatus in accordance with claim 5, wherein said threadclamp comprises a top portion forming a bottom of said second half bore, which is lined with a resilient gasket material, and a bottom portion having longitudinally extending sides, an inward facing surface of each said side having threads adapted to mate with meter threads of a gas meter.

* * * * *